US012750887B2

(12) United States Patent
Dai et al.

(10) Patent No.: US 12,750,887 B2
(45) Date of Patent: Sep. 29, 2026

(54) NARROWBAND UPLINK COMMUNICATIONS IN A RANDOM ACCESS CHANNEL PROCEDURE FOR REDUCED CAPABILITY USER EQUIPMENT

(71) Applicant: QUALCOMM Incorporated, San Diego, CA (US)

(72) Inventors: Jing Dai, Beijing (CN); Chao Wei, Beijing (CN); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 549 days.

(21) Appl. No.: 18/262,432

(22) PCT Filed: Mar. 26, 2021

(86) PCT No.: PCT/CN2021/083166

§ 371 (c)(1),
(2) Date: Jul. 21, 2023

(87) PCT Pub. No.: WO2022/198617

PCT Pub. Date: Sep. 29, 2022

(65) Prior Publication Data

US 2024/0080902 A1 Mar. 7, 2024

(51) Int. Cl.
*H04W 74/0833* (2024.01)
*H04L 5/00* (2006.01)

(52) U.S. Cl.
CPC ....... *H04W 74/0833* (2013.01); *H04L 5/0053* (2013.01); *H04L 5/0094* (2013.01)

(58) Field of Classification Search
None
See application file for complete search history.

(56) References Cited

U.S. PATENT DOCUMENTS

2021/0037573 A1* 2/2021 Ly .................... H04W 74/0833
2021/0076384 A1* 3/2021 MolavianJazi ....... H04L 5/0053
(Continued)

FOREIGN PATENT DOCUMENTS

WO 2021010786 A1 1/2021
WO 2021021353 2/2021
WO 2021035678 3/2021

OTHER PUBLICATIONS

International Search Report and Written Opinion—PCT/CN2021/083166—ISA/EPO—Dec. 27, 2021.
(Continued)

*Primary Examiner* — Faiyazkhan Ghafoerkhan
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a base station in an uplink communication during a random access channel (RACH) procedure, a first indication that the UE is a reduced capability UE type. The UE may receive, from the base station and based at least in part on transmitting the first indication, a second indication that indicates whether the UE is to perform bandwidth part switching to a target uplink bandwidth part or radio frequency re-timing within an initial uplink bandwidth part, for at least one other uplink communication during the RACH procedure. Numerous other aspects are described.

26 Claims, 13 Drawing Sheets

(56) References Cited

U.S. PATENT DOCUMENTS

| | | | | |
|---|---|---|---|---|
| 2022/0377798 | A1* | 11/2022 | Chien | H04W 74/0833 |
| 2022/0418001 | A1* | 12/2022 | Chien | H04W 74/0833 |
| 2023/0189103 | A1* | 6/2023 | Zhang | H04L 5/001 |
| 2023/0189232 | A1* | 6/2023 | Rastegardoost | H04L 5/0012 370/329 |
| 2023/0223985 | A1* | 7/2023 | Rastegardoost | H04B 1/713 375/132 |
| 2024/0080902 | A1* | 3/2024 | Dai | H04L 5/0094 |
| 2025/0048442 | A1* | 2/2025 | Chien | H04W 74/0833 |

OTHER PUBLICATIONS

Moderator (Ericsson): "FL Summary #3 for UE Complexity Reduction for RedCap," 3GPP TSG-RAN WG1 Meeting #104-e, Tdoc R1-2101851, e-Meeting, Jan. 25-Feb. 5, 2021, 55 pages, p. 7.

Huawei, et al., "Other Aspects for Reduced Capability Devices", 3GPP TSG RAN WG1 Meeting #103-e, R1-2008329, 3rd Generation Partnership Project, Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 17, 2020, XP051940090, 4 pages, paragraph [02.2].

Moderator (Intel Corporation): "Moderator Summary #3 on RedCap—Others", 3GPP TSG RAN WG1 Meeting #103-E, R1-2009608, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 6, 2020, XP051952103, pp. 1-46, paragraph [0003].

Qualcomm Incorporated: "Complexity Reduction for RedCap Devices", 3GPP TSG-RAN WG1 Meeting #104, R1-2101766, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 22, 2021, XP051975869, 13 pages, paragraph [02.1], paragraph [0004].

Supplementary European Search Report—EP21932242—Search Authority—The Hague—Nov. 14, 2024.

* cited by examiner

NARROWBAND UPLINK COMMUNICATIONS IN A RANDOM ACCESS CHANNEL PROCEDURE FOR REDUCED CAPABILITY USER EQUIPMENT

CROSS-REFERENCE TO RELATED APPLICATION

This application is a 371 national stage of Patent Cooperation Treaty (PCT) Application No. PCT/CN2021/083166 filed on Mar. 26, 2021, entitled "NARROWBAND UPLINK COMMUNICATIONS IN A RANDOM ACCESS CHANNEL PROCEDURE FOR REDUCED CAPABILITY USER EQUIPMENT," which is hereby expressly incorporated by reference herein.

FIELD OF THE DISCLOSURE

Aspects of the present disclosure generally relate to wireless communication and to techniques and apparatuses for narrowband uplink communications in a random access channel (RACH) procedure for reduced capability user equipment (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B. or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors, coupled to the memory, configured to: transmit, to a base station in an uplink communication during a random access channel (RACH) procedure, a first indication that the UE is a reduced capability UE type; and receive, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure.

In some aspects, a base station for wireless communication includes a memory and one or more processors, coupled to the memory, configured to: receive, from a UE in an uplink communication during a RACH procedure, a first indication that the UE is a reduced capability UE type; and transmit, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure.

In some aspects, a method of wireless communication performed by a UE includes transmitting, to a base station in an uplink communication during a RACH procedure, a first indication that the UE is a reduced capability UE type; and receiving, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure.

In some aspects, a method of wireless communication performed by a base station includes receiving, from a UE in an uplink communication during a RACH procedure, a first indication that the UE is a reduced capability UE type; and transmitting, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure.

In some aspects, a non-transitory computer-readable medium storing a set of instructions for wireless communication includes one or more instructions that, when executed by one or more processors of a UE, cause the UE to: transmit, to a base station in an uplink communication during a RACH procedure, a first indication that the UE is a reduced capability UE type; and receive, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure.

In some aspects, a non-transitory computer-readable medium storing a set of instructions for wireless communication includes one or more instructions that, when executed by one or more processors of a base station, cause the base station to: receive, from a UE in an uplink communication during a RACH procedure, a first indication that the UE is a reduced capability UE type; and transmit, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure.

In some aspects, an apparatus for wireless communication includes means for transmitting, to a base station in an uplink communication during a RACH procedure, a first indication that the apparatus is a reduced capability type apparatus; and means for receiving, from the base station and based at least in part on transmitting the first indication, a second indication that indicates whether to perform bandwidth part switching to a target uplink bandwidth part or radio frequency re-tuning within an initial uplink bandwidth part, for at least one other uplink communication during the RACH procedure.

In some aspects, an apparatus for wireless communication includes means for receiving, from a UE in an uplink communication during a RACH procedure, a first indication that the UE is a reduced capability UE type; and means for transmitting, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
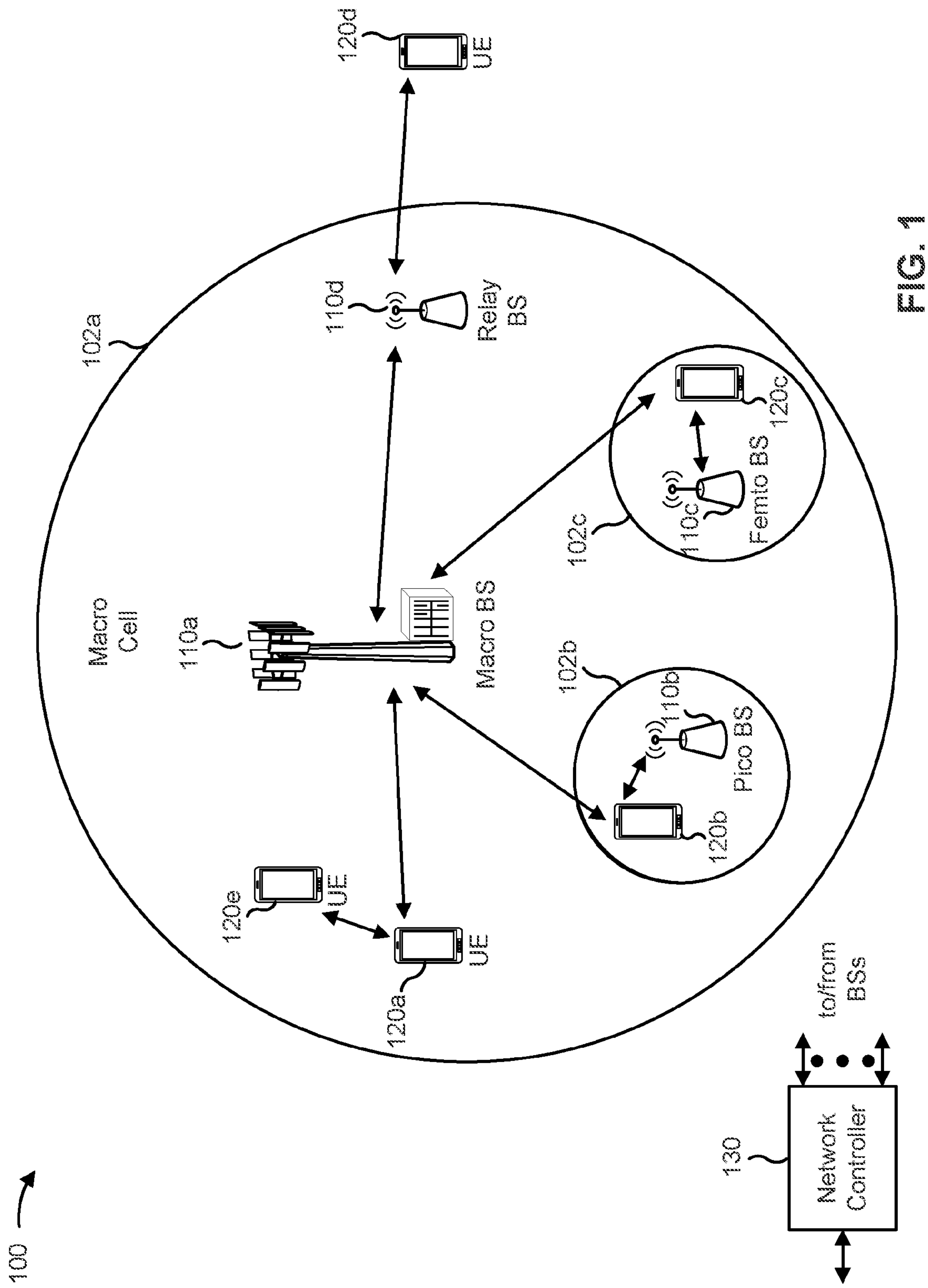
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*. BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
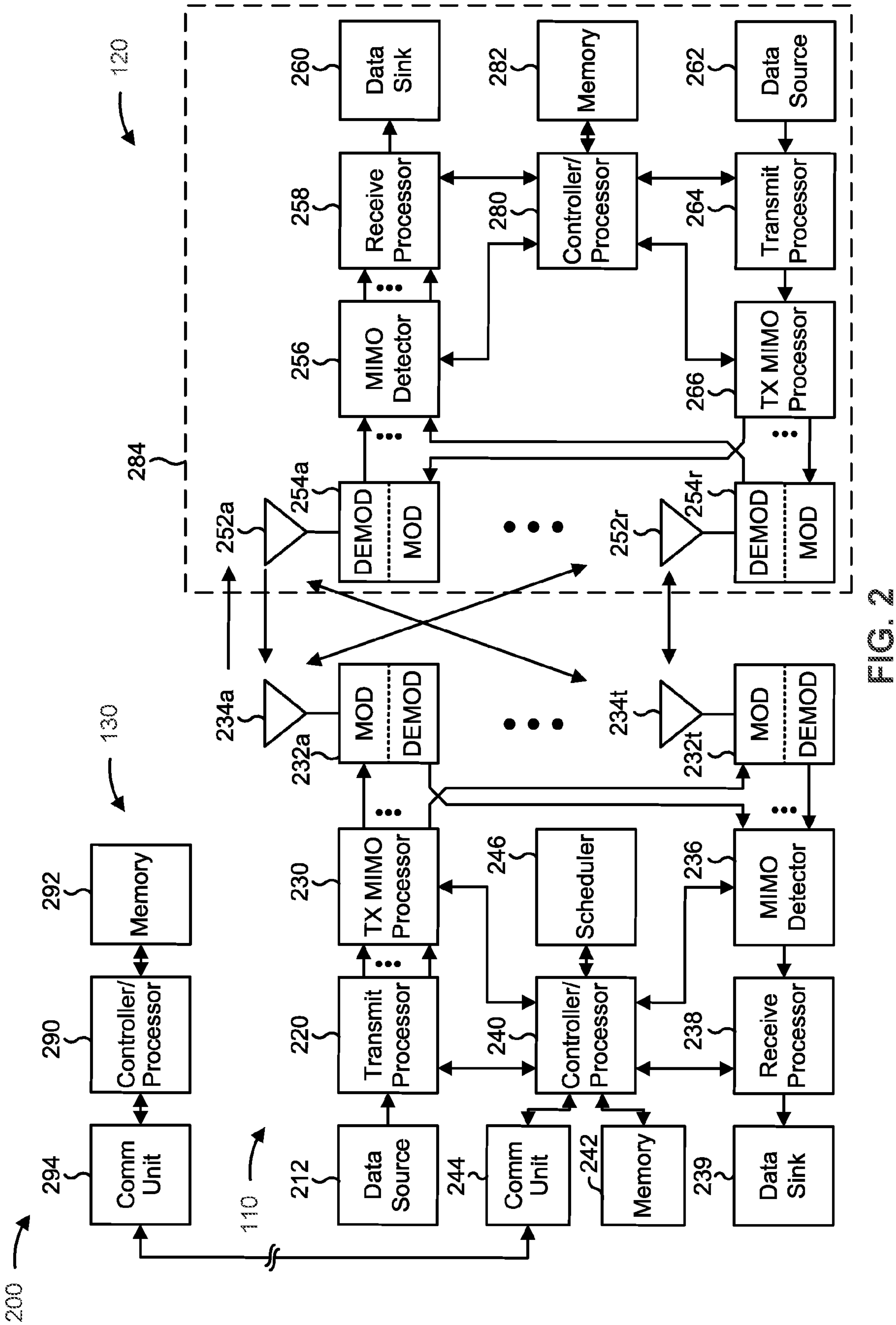
FIG. 2 is a diagram illustrating an example of abase station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP. RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-11).

Controller/processor 240 of base station 110, controller/processor 280 of UE 120, and/or any other component(s) of FIG. 2 may perform one or more techniques associated with narrowband uplink communications in a random access channel (RACH) procedure for reduced capability (RedCap) UEs, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, the UE 120 includes means for transmitting, to a base station in an uplink communication during a RACH procedure, a first indication that the UE is a reduced capability UE type; and/or means for receiving, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station 110 includes means for receiving, from a UE in an uplink communication during a RACH procedure, a first indication that the UE is a reduced capability UE type; and/or means for transmitting, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure. The means for the base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
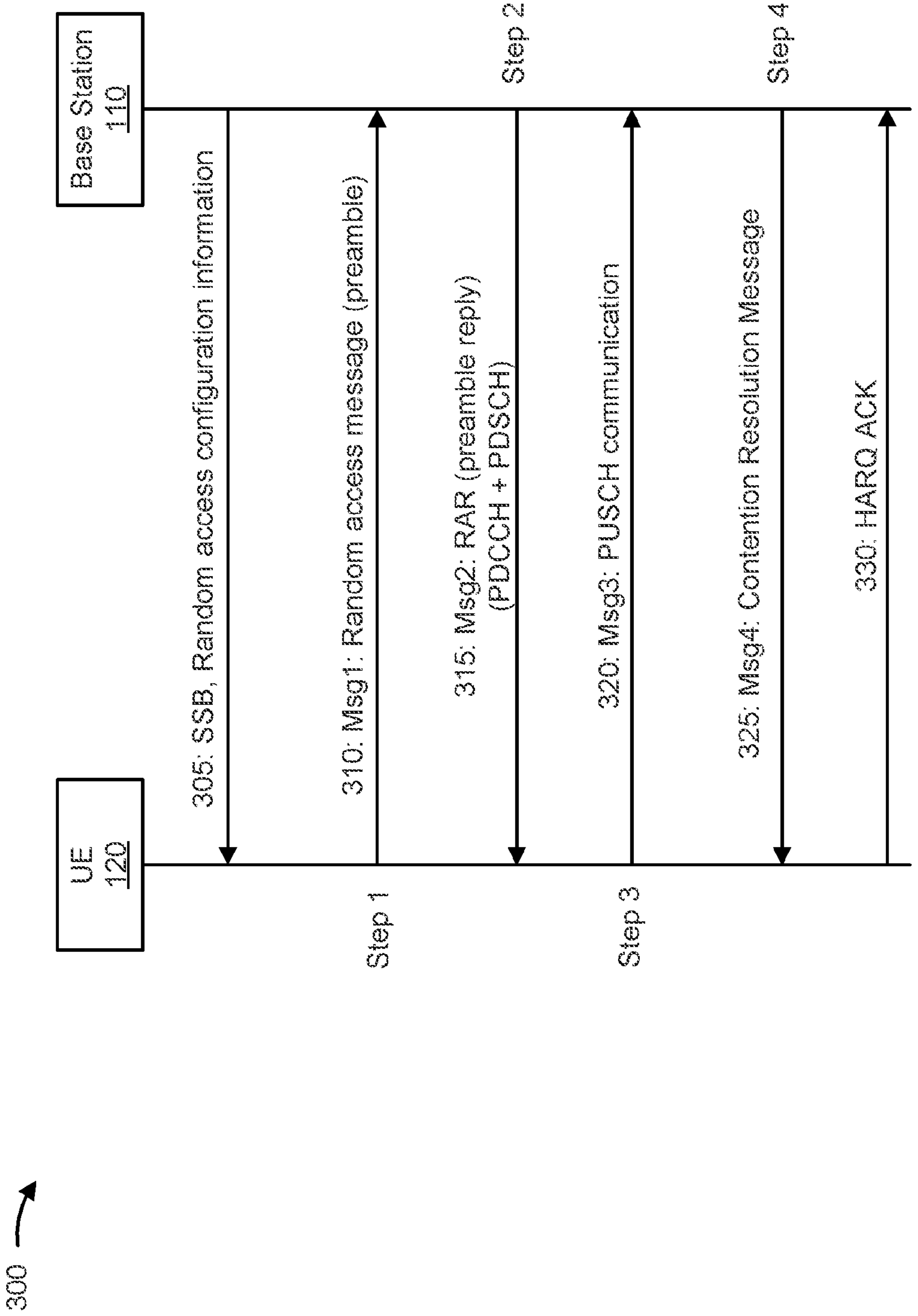
FIG. 3 is a diagram illustrating an example of a four-step random access channel (RACH) procedure, in accordance with the present disclosure.

FIG. 3 is a diagram illustrating an example 300 of a four-step RACH procedure, in accordance with the present disclosure. As shown in FIG. 3, a base station 110 and a UE 120 may communicate with one another to perform the four-step random access procedure.

As shown by reference number 305, the base station 110 may transmit, and the UE 120 may receive, one or more synchronization signal blocks (SSBs) and random access configuration information. In some examples, the random access configuration information may be transmitted in and/or indicated by system information (e.g., in one or more system information blocks (SIBs)) and/or an SSB, such as for a contention-based RACH procedure (e.g., an initial access procedure). Additionally, or alternatively, the random access configuration information may be transmitted in a radio resource control (RRC) message and/or a physical downlink control channel (PDCCH) order message that triggers a RACH procedure, such as for a contention-free RACH procedure. The random access configuration information may include one or more parameters to be used in the random access procedure, such as one or more parameters for transmitting a random access message (RAM) and/or one or more parameters for receiving a random access response (RAR).

As shown by reference number 310, the UE 120 may transmit a RAM, which may include a preamble (sometimes referred to as a random access preamble, a physical random access channel (PRACH) preamble, or a RAM preamble). The message that includes the preamble may be referred to as a message 1. Msg1, MSG1, a random access request, a first message, or an initial message in a four-step random access procedure. The RAM may include a random access preamble identifier.

As shown by reference number 315, the base station 110 may transmit an RAR as a reply to the preamble. The message that includes the RAR may be referred to as message 2, Msg2, MSG2, or a second message in a four-step random access procedure. In some aspects, the RAR may indicate the detected random access preamble identifier (e.g., received from the UE 120 in Msg1). Additionally, or alternatively, the RAR may indicate a resource allocation to be used by the UE 120 to transmit message 3 (Msg3).

In some examples, as part of the second step of the four-step random access procedure, the base station 110 may transmit a PDCCH communication for the RAR. The PDCCH communication may schedule a physical downlink shared channel (PDSCH) communication that includes the RAR. For example, the PDCCH communication may include downlink control information (DCI) that indicates a resource allocation for the PDSCH communication. The DCI included in the PDCCH communication may be masked by a random access radio network temporary identifier (RA-RNTI). For example, the DCI may include a cyclic redundancy check (CRC) that is scrambled with an RA-RNTI value determined from the PRACH preamble. Also, as part of the second step of the four-step random access procedure, the base station 110 may transmit the PDSCH communication for the RAR, as scheduled by the PDCCH communication. The RAR may be included in a medium access control (MAC) protocol data unit (PDU) of the PDSCH communication.

As shown by reference number 320, the UE 120 may transmit a physical uplink shared channel (PUSCH) communication using the resources allocated by the Msg2 RAR. In some cases, the PUSCH communication may include an RRC connection request, such an RRC setup request, an RRC resume request, or an RRC connection reestablishment request. The PUSCH communication may be referred to as message 3, Msg3, MSG3, an RRC connection request message, or a third message of a four-step random access procedure. In some aspects, the Msg 3 PUSCH communication may include a UE identifier, uplink control information (UCI), and/or an RRC connection request.

As shown by reference number 325, the base station 110 may transmit a contention resolution message. The contention resolution message may be referred to as message 4, msg4, MSG4, an RRC connection setup message, or a fourth message of a four-step random access procedure. In some aspects, the contention resolution message may include the detected UE identifier, a timing advance value, and/or contention resolution information. As shown by reference number 330, if the UE 120 successfully receives the RRC connection setup message, the UE 120 may transmit a hybrid automatic repeat request (HARQ) acknowledgement ACK.

As indicated above, FIG. 3 is provided as an example. Other examples may differ from what is described with regard to FIG. 3.

Figure 4:
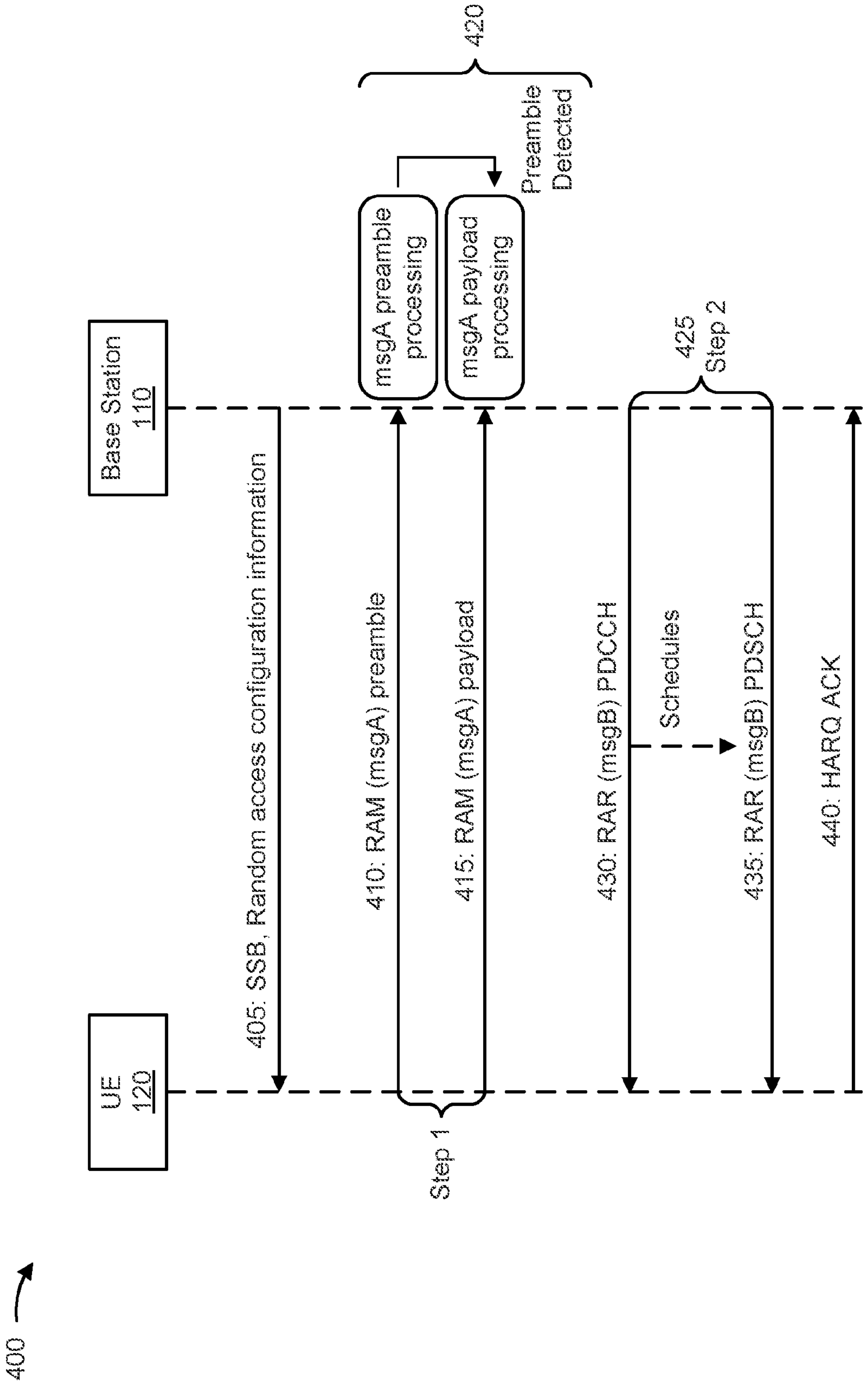
FIG. 4 is a diagram illustrating an example 400 of a two-step RACH procedure, in accordance with the present disclosure

FIG. 4 is a diagram illustrating an example 400 of a two-step RACH procedure, in accordance with the present disclosure. As shown in FIG. 4, a base station 110 and a UE 120 may communicate with one another to perform the two-step random access procedure.

As shown by reference number 405, the base station 110 may transmit, and the UE 120 may receive, one or more SSBs and random access configuration information. In some aspects, the random access configuration information may be transmitted in and/or indicated by system information (e.g., in one or more SIBs) and/or an SSB, such as for contention-based random access. Additionally, or alternatively, the random access configuration information may be transmitted in an RRC message and/or a PDCCH order message that triggers a RACH procedure, such as for contention-free random access. The random access configuration information may include one or more parameters to be used in the two-step random access procedure, such as one or more parameters for transmitting an RAM and/or receiving an RAR to the RAM.

As shown by reference number 410, the UE 120 may transmit, and the base station 110 may receive, a RAM preamble. As shown by reference number 415, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, MsgA, a first message, or an initial message in a two-step random access procedure. Furthermore, in some aspects, the RAM preamble may be referred to as a message A preamble, a MsgA preamble, a preamble, or a PRACH preamble, and the RAM payload may be referred to as a message A payload, a MsgA payload, a MsgA PUSCH, or a payload. In some aspects, the RAM may include some or all of the contents of message 1 (Msg1) and message 3 (Msg3) of the four-step random access procedure, which is described above in connection with FIG. 3. For example, the RAM preamble may include some or all contents of message 1 (e.g., a PRACH preamble), and the RAM payload may include a PUSCH communication including some or all contents of message 3 (e.g., a UE identifier, UCI, and/or an RRC connection request).

As shown by reference number 420, the base station 110 may receive the RAM preamble transmitted by the UE 120. If the base station 110 successfully receives and decodes the RAM preamble, the base station 110 may then receive and decode the RAM payload.

As shown by reference number 425, the base station 110 may transmit an RAR (sometimes referred to as an RAR message). As shown, the base station 110 may transmit the RAR message as part of a second step of the two-step random access procedure. In some aspects, the RAR message may be referred to as message B, MsgB, or a second message in a two-step random access procedure. The RAR message may include some or all of the contents of message 2 (Msg2) and message 4 (Msg4) of a four-step random access procedure. For example, the RAR message may include the detected PRACH preamble identifier, the detected UE identifier, a timing advance value, and/or contention resolution information.

As shown by reference number 430, as part of the second step of the two-step random access procedure, the base station 110 may transmit a PDCCH communication for the RAR. The PDCCH communication may schedule a PDSCH communication that includes the RAR. For example, the PDCCH communication may indicate a resource allocation (e.g., in DCI) for the PDSCH communication. The DCI may be masked by a MsgB radio network temporary identifier (MsgB-RNTI) that is determined from the PRACH preamble.

As shown by reference number 435, as part of the second step of the two-step random access procedure, the base station 110 may transmit the PDSCH communication for the RAR, as scheduled by the PDCCH communication. The RAR may be included in a MAC PDU of the PDSCH communication. As shown by reference number 440, if the UE 120 successfully receives the RAR, the UE 120 may transmit a HARQ ACK.

As indicated above, FIG. 4 is provided as an example. Other examples may differ from what is described with regard to FIG. 4.

In some aspects, abase station may serve different UEs of different categories and/or different UEs that support different capabilities. For example, the base station may serve a first category of UEs that have a less advanced capability (e.g., a lower capability and/or a reduced capability) and a second category of UEs that have a more advanced capability (e.g., a higher capability). A UE of the first category may have a reduced feature set compared to UEs of the second category, and may be referred to as a RedCap UE, a low tier UE, and/or an NR-Lite UE, among other examples. A UE of the first category may be, for example, an MTC UE, an eMTC UE, and/or an IoT UE, as described above in connection with FIG. 1. A UE of the second category may have an advanced feature set compared to UEs of the second category, and may be referred to as a baseline UE, a high tier UE, an NR UE, a non-RedCap UE, and/or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum MCS than UEs of the second category (e.g., quadrature phase shift keying (QPSK) or the like as compared to 256-quadrature amplitude modulation (QAM) or the like), may support a lower maximum transmit power than UEs of the second category, may have a less advanced beamforming capability than UEs of the second category (e.g., may not be capable of forming as many beams as UEs of the second category), may require a longer processing time than UEs of the second category, may include less hardware than UEs of the second category (e.g., fewer antennas, fewer transmit antennas, and/or fewer receive antennas), and/or may not be capable of communicating on as wide of a maximum bandwidth part as UEs of the second category, among other examples. Additionally. or alternatively, UEs of the second category may be capable of communicating using a shortened transmission time interval (TTI) (e.g., a slot length of 1 ms or less, 0.5 ms, 0.25 ms, 0.125 ms, 0.0625 ms, or the like, depending on a sub-carrier spacing), and UEs of the first category may not be capable of communicating using the shortened TIT.

RedCap UEs may be capable of communicating within a smaller bandwidth (e.g., 20 MHz, 30 MHz, or 40 MHz), as compared with non-RedCap UEs. UE capabilities may be signaled to a base station after an RRC connection is established between the UE and the base station. However, the base station may not be aware of the UE's capabilities during a RACH procedure, such as an initial access procedure. During such a RACH procedure, uplink transmissions (e.g., Msg 3 PUSCH and/or HARQ ACK for Msg4 or for MsgB) for a UE may be allocated using frequency hopping. Frequency hopping is a technique for transmitting radio signals by rapidly changing the carrier frequency among multiple distinct frequencies in a frequency band. For a RedCap UE, the frequency hopping for the uplink transmissions during the RACH procedure may be allocated in a bandwidth that is larger than the RedCap UE's capability. This may lead to RACH failure, resulting in an inability of the UE to connect to the network and/or increased latency and power consumption for a UE (e.g., due to the UE having to perform multiple repetitions of the RACH procedure).

Some techniques and apparatuses described herein enable a UE to transmit, to a base station in an uplink communication during a RACH procedure, a first indication that the UE is a RedCap UE type. For example, the UE may transmit the first indication in a Msg 1 communication, a Msg3 communication, or a MsgA communication. The base station may receive the first indication. The base station may transmit, to the UE and based at least in part on receiving the first indication, a second indication that indicates whether the UE is to perform bandwidth part (BWP) switching to a target uplink BWP or radio frequency (RF) re-tuning within an initial uplink BWP, for at least one other uplink communication during the RACH procedure. The UE may receive the second indication from the base station. In some aspects, the UE may transmit at least one other uplink communication during the RACH procedure (e.g., a Msg3 communication, a HARQ ACK for Msg4, or HARQ ACK for MsgB) using BWP switching or RF re-tuning based at least in part on the second indication. For BWP switching, the target BWP may be narrower than the initial BWP, and thus in the bandwidth capability of the UE. For RF re-tuning, the UE may puncture one or more symbols from transmissions on multiple frequencies, resulting in an RF re-tuning gap in which the UE may perform the RF-retuning. As a result, a RedCap UE may transmit one or more uplink communications during a RACH procedure with frequency hopping, which may decrease RACH failures for RedCap UEs. This may cause an increase in connection reliability and connection speed and a decrease in latency for RedCap UEs, and may also reduce power consumption by RedCap UEs due to fewer repetitions of the RACH procedure. Furthermore, the dynamic signaling, by the base station, of whether the UE is to perform BWP switching or RF re-tuning increases flexibility (e.g., based at least in part on network coverage considerations and/or network resource utility efficiency considerations) as compared with all RedCap UEs being configured to perform either BWP switching or RF re-tuning.

Figure 5:
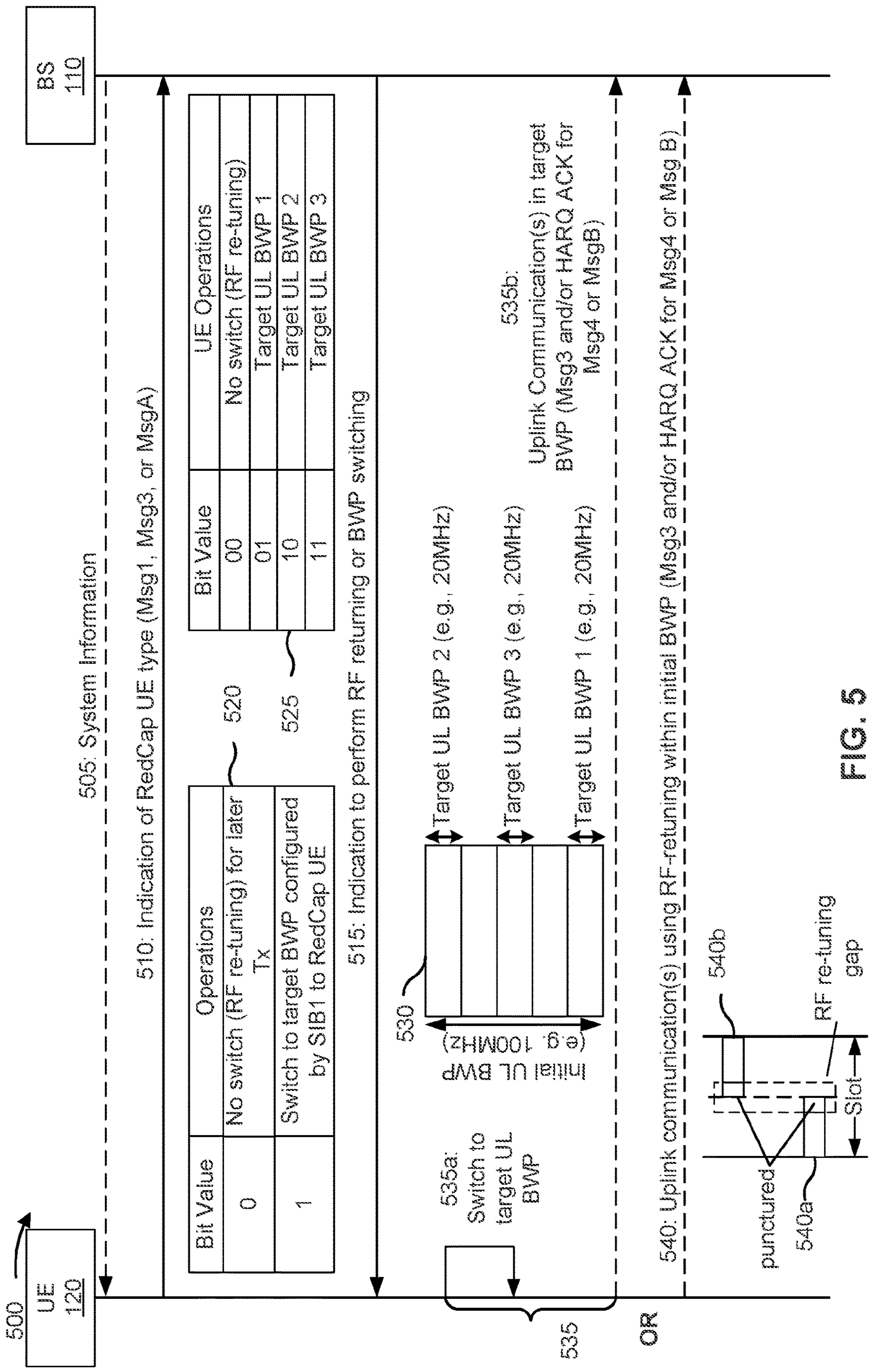
FIGS. 5-9 are diagrams illustrating examples associated with narrowband uplink communications in a RACH procedure for reduced capability (RedCap) UEs, in accordance with the present disclosure.

FIG. 5 is a diagram illustrating an example 500 associated with narrowband uplink communications in a RACH procedure for RedCap UEs, in accordance with the present disclosure. As shown in FIG. 5, example 500 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink. In some aspects, the UE 120 may be a Redcap UE.

As shown in FIG. 5, and by reference number 505, the base station 110 may transmit, and the UE 120 may receive, system information. For example, the base station 110 may broadcast the system information in one or more SIBs. The system information may include random access configuration information. The random access configuration information may include one or more parameters to be used in a RACH procedure (e.g., the four-step RACH procedure and/or the two-step RACH procedure), such as one or more parameters for transmitting a PRACH preamble and/or receiving an RAR.

In some aspects, the system information may indicate a configuration for an initial uplink BWP to be used by the UE 120 for uplink transmissions. For example, the initial uplink BWP may be a BWP for the UE 120 to use for uplink transmissions during a RACH procedure (e.g., an initial access procedure). In some aspects, the system information may indicate the configuration for the initial uplink BWP and a configuration for a target uplink BWP for RedCap UEs. In this case, the target uplink BWP may have a narrower bandwidth than the initial uplink BWP. For example, the target uplink BWP may be a narrow BWP (e.g., 20 MHz) dedicated for RedCap UEs, and the initial uplink BWP may have a wide bandwidth (e.g., 100 MHz), as compared to the target uplink BWP.

The target uplink BWP may be configured within the initial uplink BWP. In some aspects, the target uplink BWP may be configured to be located at an edge of the initial uplink BWP. For example, the target uplink BWP may be configured with a particular bandwidth (e.g., 20 MHz) and may be configured to start at a first physical resource block (PRB) (e.g., PRB #0) in the initial uplink BWP. In this case, the target uplink BWP may be configured to be located on a first edge of the initial uplink BWP. In some examples, the target uplink BWP may be configured with a particular bandwidth (e.g., 20 MHz) and may be configured to start at a PRB index associated with $BW_{initialBWP}-BW_{targetBWP}$, where $BW_{initialBWP}$ is the bandwidth of the initial uplink BWP and $BW_{targetBWP}$ is the bandwidth of the target uplink BWP. In this case, the target uplink BWP may be configured to be located on a second edge of the initial uplink BWP. In some aspects, the target BWP may be configured with a particular bandwidth (e.g., 20 MHz) and may be configured to be centered on a same center frequency as a control resource set (CORESET) with an index 0 (CORESET #0), which is a CORESET associated with an initial downlink BWP. A configuration of CORESET #0 may be included in a master information block (MIB) broadcast by the base station 110.

The target uplink BWP may be configured to have a same subcarrier spacing (SCS) as the initial uplink BWP. In some aspects, the system information may include an indication of a number of PRBs in the target uplink BWP. In some aspects, the number of PRBs in the target uplink BWP may be set based at least in part on the bandwidth of the target uplink BWP and the SCS of the target uplink BWP. For example, a wireless communication standard may specify a number of PRBs associated with the bandwidth (e.g., 20 MHz) and SCS of the target uplink BWP.

In some aspects, the system information that indicates the configuration for the initial uplink BWP and/or the configuration for the target uplink BWP may be included in an SIB, such as a type 1 SIB (SIB1). For example, the base station 110 may transmit, and the UE 120 may receive, the SIB1 including the system information that indicates the configuration for the initial uplink BWP and/or the configuration for the target uplink BWP.

As further shown in FIG. 5, and by reference number 510, the UE 120 may transmit, to the base station 110 in an uplink communication during a RACH procedure, an indication that the UE 120 is a RedCap UE type. The indication that the UE 120 is a RedCap UE type may also be referred to herein as the "first indication." For example, the RACH procedure may be an initial access RACH procedure. In some aspects, the RACH procedure may be a four-step RACH procedure. In this case, the UE 120 may transmit the first indication to the base station 110 in a Msg 1 communication (e.g., Msg1 PRACH preamble transmission) or in a Msg3 PUSCH communication. In some aspects, the RACH procedure may be a two-step RACH procedure. In this case, the UE 120 may transmit the first indication to the base station 110 in a MsgA communication. For example, in the two-step RACH procedure, the UE 120 may transmit the first indication to the base station 110 in a MsgA preamble transmission or in a MsgA PUSCH communication (e.g., MsgA payload transmission).

In some aspects, the uplink transmission (e.g., Msg1, Msg3, or MsgA) may include an indication (e.g., a one bit indication) of whether the UE 120 is a RedCap UE type or a non-RedCap UE type. In some aspects, the uplink transmission may include an indication of a type of RedCap UE for the UE 120, from multiple RedCap UE types.

As further shown in FIG. 5, and by reference number 515, the base station 110 may transmit, to the UE 120, an indication that the UE 120 is to perform BWP switching to a target uplink BWP or RF re-tuning within the initial uplink BWP, for at least one other uplink communication during the RACH procedure. This indication may be referred to herein as the "second indication." The base station 110 may transmit the second indication based at least in part on receiving the first indication that indicates that the UE 120 is a RedCap UE type. For example, based at least in part on the indication that the UE 120 is a RedCap UE (and/or a particular type of RedCap UE), the base station 110 may determine whether the UE 120 is to transmit one or more subsequent uplink communications (e.g., one or more uplink communications with frequency hopping) during the RACH procedure using a narrow uplink BWP (e.g., the target uplink BWP) or by performing RF frequency re-tuning within the initial uplink BWP. In some aspects, the base station 110 and/or a core network device (e.g., 5G core network) may select the second indication to indicate BWP switching or RF-retuning for the UE 120 based at least in part network coverage considerations and/or resource utility efficiency considerations. The UE 120 may receive the second indication and determine whether to transmit the one or more subsequent uplink communications using BWP switching or using RF re-tuning based at least in part on the second indication.

The second indication may be included in a downlink communication during the RACH process. In some aspects, the base station 110 may transmit the second indication in DCI masked by a temporary cell radio network temporary identifier (TC-RNTI). For example, the second indication may be included in Msg4 DCI (e.g., DCI associated with scheduling a Msg4 PDSCH communication) and/or DCI associated with scheduling retransmission of the Msg3 PUSCH communication. The DCI associated with scheduling the Msg4 PDSCH communication may be DCI format 1_0, which may include a reserved downlink assignment index (DAI) field. In some aspects, the reserved DAI field of the Msg4 DCI may be used/re-purposed for the second indication. The DCI associated with scheduling retransmission of the Msg3 PUSCH communication may be DCI format 0_0, which may include a reserved new data indication (NDI) field and a reserved HARQ process identifier (ID) field. In some aspects, the reserved NDI field and/or the HARQ process ID field of the DCI associated with scheduling retransmission of the Msg3 PUSCH communication may be used/re-purposed for the second indication. In some aspects, the base station 110 may transmit the second indication via DCI masked by TC-RNTI (e.g., in the Msg4 DCI and/or the DCI scheduling retransmission of Msg3) in a case in which the UE 120 transmits the first indication in the Msg3 PUSCH communication and/or in a case in which the UE 120 transmits the first indication in the Msg 1 communication.

In some aspects, in a case in which the UE 120 transmits the first indication in the Msg1 communication, the base station 110 may transmit the second indication in DCI masked by RA-RNTI. For example, the second indication may be included in Msg2 DCI (e.g., DCI associated with scheduling a Msg2 PDSCH communication including the RAR). In some aspects, the Msg2 DCI may be DCI format 1_0, and a DAI field of the Msg2 DCI may be used/re-purposed for the second indication. In some aspects, in a case in which the UE 120 transmits the first indication in the Msg1 communication, the base station 110 may transmit the second indication in the Msg2 RAR communication (e.g., the Msg2 PDSCH communication including the RAR). In some aspects, a reserved channel state information (CSI) request field of the RAR may be used/re-purposed for the second indication.

In some aspects, in a case in which the UE 120 transmits the first indication in the MsgA communication (e.g., the MsgA preamble of the MsgA payload), the base station 110 may transmit the second indication in DCI masked by MsgB-RNTI. For example, the second indication may be included in MsgB DCI (e.g., DCI associated with scheduling a MsgB PDSCH communication including the RAR). In some aspects, the MsgB DCI may be DCI format 1_0, and a DAI field of the MsgB DCI may be used/re-purposed for the second indication. In some aspects, in a case in which the UE 120 transmits the first indication in the MsgA communication (e.g., the MsgA preamble of the MsgA payload), the base station 110 may transmit the second indication in the MsgB PDSCH communication (e.g., the MsgB PDSCH communication including the RAR). In some aspects, a CSI request field of the RAR transmitted in the MsgB PDSCH communication may be used/re-purposed for the second indication.

In some aspects, the configuration of the target uplink BWP for RedCap UEs may be indicated in the system information (e.g., the system information received in SIB1). For example, the configuration of the bandwidth of the target uplink BWP and the location of the target uplink BWP within the initial uplink BWP may be indicated in the system information. As shown by reference number 520, in some aspects, the second indication may include an indication of whether or not to perform BWP switching to the target uplink BWP. For example, the second indication may include a one bit indication that indicates whether or not to perform BWP switching. A first indicated bit value (e.g., 0) for the second indication may correspond to an indication for the UE 120 to not perform BWP switching for the one or more subsequent uplink communications in the RACH procedure. In this case the indication to not perform BWP switching may also be an indication for the UE 120 to perform RF re-tuning for the one or more subsequent uplink communications in the RACH procedure. A second indicated bit value (e.g., 1) for the second indication may correspond to an indication to perform BWP switching from the initial uplink BWP to the configured target uplink BWP (e.g., the target BWP configured in the system information). In some aspects, the target BWP may be set in a wireless communication standard as a portion of the initial uplink BWP. In this case, the second indicated bit value (e.g., 1) for the second indication may correspond to an indication to perform BWP switching from the initial uplink target BWP to the target UL BWP set in the wireless communication standard.

In some aspects, the system information may not include a configuration of the target BWP. As shown by reference number 525, in some aspects, the second indication may indicate whether or not to perform BWP switching to a target uplink BWP, and may indicate a location of the target uplink BWP within the initial uplink BWP. In this case, the second indication may include two or more bits, with a bit value that corresponds to an indication to not perform BWP switching (e.g., an indication to perform RF re-tuning) and multiple bit values (e.g., 01, 10, and 11) that correspond to indications to perform BWP switching with different respective target uplink BWP candidates. For example, as shown by reference number 525, a first indicated bit value (e.g., 00) may correspond to an indication to not perform BWP switching (e.g., an indication to perform RF re-tuning), a second indicated bit value (e.g., 01) may correspond to a first target uplink BWP candidate (e.g., target UL BWP 1), a third indicated bit value (e.g., 10) may correspond to a second target uplink BWP candidate (e.g., target UL BWP 2), and a fourth indicated bit value (e.g., 11) may correspond to a third target uplink BWP candidate (e.g., target UL BWP 1).

As shown by reference number 530, target UL BWP 1 may be located at a first edge of the initial uplink BWP, target UL BWP 2 may be located at a second edge of the initial uplink BWP, and target UL BWP 3 may be centered at a same center frequency as the CORESET #0. As shown in FIG. 5, in some aspects, the target uplink BWP candidates may have the same bandwidth (e.g., 20 MHz). In some aspects, at least some of the target uplink BWP candidates may have different bandwidths. The target uplink BWP candidates may have the same SCS as the initial uplink BWP. In some aspects, the target uplink BWP candidates and the corresponding bit values for the second indication may be set in a wireless communication standard. In some aspects, the target uplink BWP candidates and the corresponding bit values for the second indication may be configured in the system information (e.g., in SIB1). In some aspects, the number of PRBs in the target uplink BWP candidates may be configured in the system information or may be set in a wireless communication standard (e.g., for the bandwidth and the SCS of the target uplink BWP candidates).

As further shown in FIG. 5, and by reference number 535, based at least in part on the second indication including an indication to perform BWP switching, the UE 120 may perform BWP switching for one or more subsequent uplink communications in the RACH procedure. As shown by reference number 535*a*, the UE 120 may switch from the initial uplink BWP to the target uplink BWP. The UE 120 may determine the target uplink BWP based at least in part on a target uplink BWP configuration in the system information and/or the target uplink BWP candidate indicated by the second indication. In some aspects, the target uplink BWP may be located within the initial uplink BWP, at an edge of the initial uplink BWP (e.g., target UL BWP 1 and/or target UL BWP 2). This may provide a benefit of avoiding resource fragmentation in the remaining portion of the initial uplink BWP. In some aspects, the target uplink BWP may be located within the initial uplink BWP and centered at the same center frequency as the CORESET #0 (e.g., target UL BWP 3). This may provide a benefit of avoiding RF re-tuning between uplink transmission in the target uplink BWP and downlink monitoring/reception in the CORESET #0 in a time division duplex (TDD) mode.

As shown by reference number 535*b*, the UE 120 may transmit one or more subsequent uplink communications during the RACH procedure in the target uplink BWP. In some aspects, the UE 120 may transmit one or more subsequent uplink communications during the RACH procedure using frequency hopping with carrier frequencies within the target uplink BWP. For example, the base station 110 may allocate resources of the UE 120 to transmit the one or more subsequent uplink communications using frequency hopping on multiple frequencies within the target uplink BWP. This provides a benefit of enabling frequency hopping in a narrow BWP associated with RedCap UEs, without the UE 120 performing RF re-tuning. In some aspects, the UE 120 may transmit a HARQ ACK for Msg4 (e.g., in a PUCCH communication) in the target uplink BWP. In some aspects, the UE 120 may transmit a Msg3 PUSCH communication and/or the HARQ ACK for Msg4 in the target uplink BWP. In some aspects, the UE 120 may transmit a HARQ ACK for MsgB (e.g., in a PUCCH communication) in the target uplink BWP.

As further shown in FIG. 5, and by reference number 540, based at least in part on the second indication including an indication to perform RF re-tuning (e.g., an indication not to perform BWP switching), the UE 120 may transmit one or more subsequent uplink communications during the RACH procedure using RF re-tuning within the initial uplink BWP. In this case, the UE 120 may transmit an uplink communication with frequency hopping by performing RF re-tuning between transmissions on different carrier frequencies that are separated by a bandwidth that is greater than the bandwidth capability of the UE 120. In some aspects, the UE 120 may transmit a HARQ ACK for Msg4 (e.g., in a PUCCH communication) using frequency hopping with RF re-tuning. In some aspects, the UE 120 may transmit a Msg3 PUSCH and/or the HARQ ACK for Msg4 using frequency hopping with RF re-tuning. In some aspects, the UE 120 may transmit a HARQ ACK for MsgB (e.g., in a PUCCH communication) using frequency hopping with RF re-tuning.

The UE 120 may transmit an uplink communication with frequency hopping within the initial uplink BWP in multiple transmissions on different carrier frequencies. For example, as shown in FIG. 5, the UE 120 may transmit an uplink communication in at least a first transmission 540*a* on a first carrier frequency and a second transmission 540*b* on a second carrier frequency. In some aspects, the UE 120 may puncture one or more symbols from at least one of the first transmission 540*a* or the second transmission 540*b* to define an RF re-tuning gap between the first transmission 540*a* and the second transmission 540*b*. "Puncturing" refers to shortening of encoded data (e.g., a code or codeword) by removing parity bits and/or symbols after encoding the data with an error correction code (e.g., a CRC). Puncturing a symbol from a transmission, communication, or resource set refers to removing that symbol (e.g., puncturing all of the bits in a binary representation of the symbol). In some aspects, the UE 120 may puncture one or more bits of the first transmission 540*a* and/or the second transmission 540*b* based at least in part on a symbol puncture pattern.

The symbol puncture pattern may be defined to accommodate the RF re-tuning gap for the UE 120. For example, based at least in part on the symbol puncture pattern, a total number of symbols to be punctured from the first transmission 540*a* and/or the second transmission 540*b* may correspond to a length of the RF re-tuning gap for the UE 120. In some aspects, the length of the RF re-tuning gap defined by the symbol length of the RF re-tuning gap for the UE 120 may be based at least in part on a UE capability and/or based at least in part on the SCS in the initial uplink BWP (e.g., 2 symbol length for 15 kHz SCS). In some aspects, the symbol puncture pattern may puncture a same number of symbols from the first transmission 540*a* (e.g., from an end of the first transmission 540*a*) as from the second transmission 540*b* (e.g., from a beginning of the second transmission 540*b*). In some aspects, the symbol puncture pattern may not puncture DMRS symbols from the first transmission 540*a* or from the second transmission 540*b*.

As shown in FIG. 5, puncturing symbols from the first transmission 540*a* and the second transmission 540*b* may result in an RF re-tuning gap between the first transmission 540*a* and the second transmission 540*b*. During the RF re-tuning gap, the UE 120 may perform RF re-tuning from a first frequency band that includes the carrier frequency for the first transmission 540*a* to a second frequency band that includes the carrier frequency for the second transmission 540*b*.

As described above in connection with FIG. 5, the UE 120 may transmit, to the base station 110 in an uplink communication during a RACH procedure, a first indication that the UE is a RedCap UE type. For example, the UE may transmit the first indication in a Msg1 communication, a Msg3 communication, or a MsgA communication. The base station 110 may transmit, to the UE 120 and based at least in part on receiving the first indication, a second indication that indicates whether the UE 120 is to perform BWP switching or RF re-tuning, for at least one other uplink communication during the RACH procedure. The UE 120 may transmit at least one other uplink communication during the RACH procedure (e.g., a Msg3 communication, a HARQ ACK for Msg4, or HARQ ACK for MsgB) using BWP switching or RF re-tuning based at least in part on the second indication. For BWP switching, the target BWP may be narrower than the initial BWP, and thus in the bandwidth capability of the UE 120. For RF re-tuning, the UE 120 may puncture one or more symbols from transmissions on multiple frequencies, resulting in an RF re-tuning gap in which the UE may perform the RF-retuning. As a result, the RedCap UE 120 may transmit one or more uplink communications during a RACH procedure with frequency hopping, which may decrease RACH failures. This may cause an increase in connection reliability and connection speed and a decrease in latency for the UE 120, and may also reduce power consumption by the UE 120 due to fewer repetitions of the RACH procedure.

As indicated above, FIG. 5 is provided as an example. Other examples may differ from what is described with respect to FIG. 5.

Figure 6:
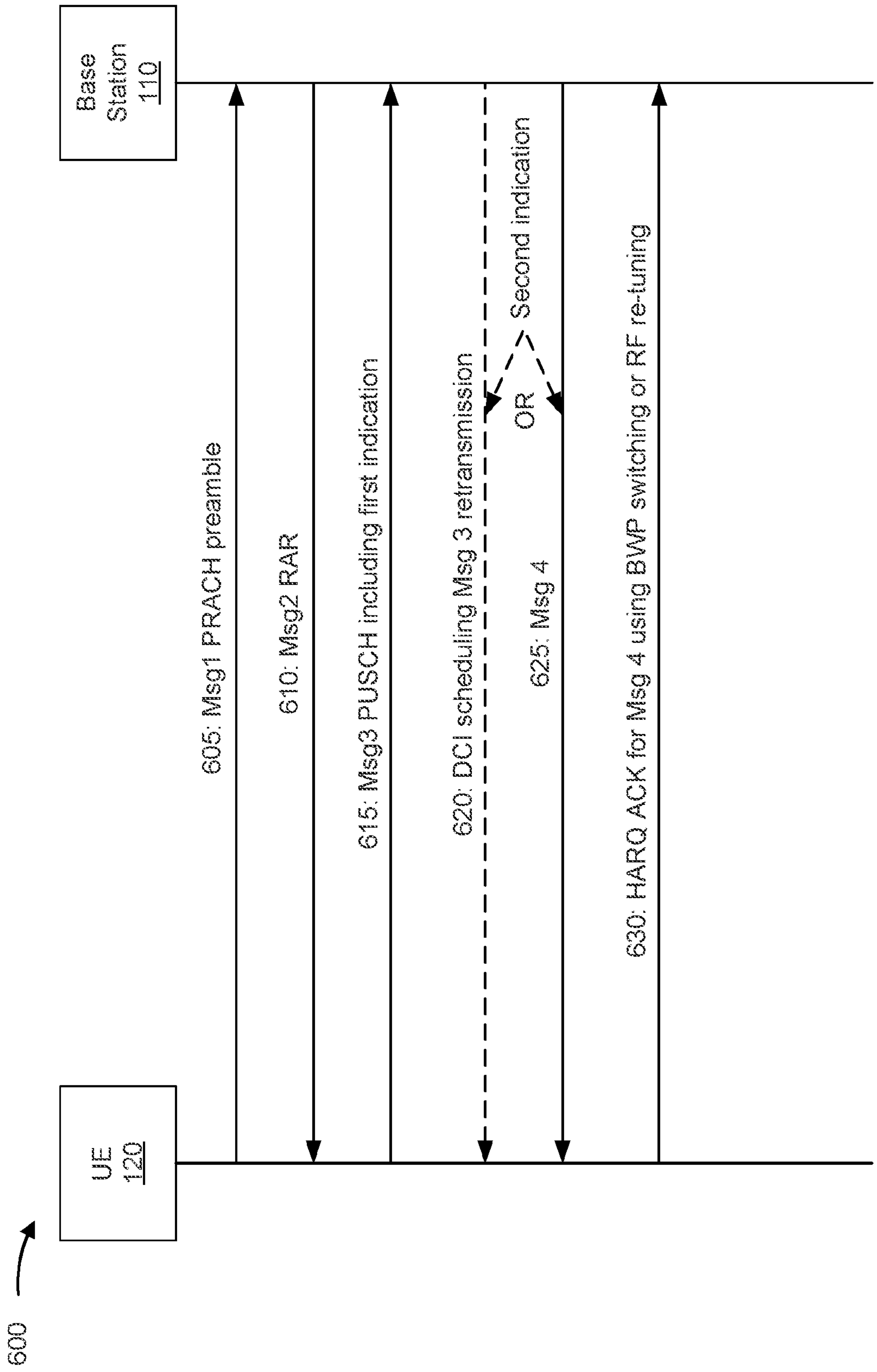

FIG. 6 is a diagram illustrating an example 600 associated with narrowband uplink communications in a RACH procedure for RedCap UEs, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink. In some aspects, the UE 120 may be a Redcap UE.

As shown in FIG. 6, and by reference number 605, the UE 120 may transmit, to the base station 110, a Msg1 communication. For example, the Msg1 communication may include a random access request in which the UE 120 transmits a PRACH preamble to the base station 110. The UE 120 may transmit the Msg 1 communication to initiate a four-step RACH procedure.

As further shown in FIG. 6, and by reference number 610, the base station 110 may transmit, to the UE 120, a Msg2 RAR. For example, the base station 110 may transmit, to the UE 120, a Msg2 PDCCH communication including Msg2 DCI (e.g., DCI masked by RA-RNTI) that schedules a Msg2 PDSCH communication. The base station 110 may transmit the RAR to the UE 120 in the scheduled Msg2 PDSCH communication. The RAR may indicate a resource allocation for a Msg3 PUSCH communication.

As further shown in FIG. 6, and by reference number 615, the UE 120 may transmit the Msg3 communication including the first indication. As described above, the first indication may be an indication that the UE 120 is a RedCap UE type. In some aspects, the first indication may be a one bit indication of whether the UE 120 is a RedCap UE type or a non-RedCap UE type. In some aspects, the first indication may indicate a type of RedCap UE for the UE 120, from multiple RedCap UE types. In some aspects, the indication may be included in one or more bit fields of the Msg3 PUSCH communication.

As further shown in FIG. 6, and by reference number 620, in some aspects, the base station 110 may transmit, to the UE 120, DCI scheduling Msg3 retransmission by the UE 120. For example, the base station 110 may transmit, to the UE 120, a PDCCH communication including the DCI scheduling Msg3 retransmission based at least in part on the base station 110 being unable to fully decode the Msg3 PUSCH communication transmitted by the UE 120. The DCI scheduling Msg3 retransmission may be DCI masked by TC-RNTI. In some aspects, the base station 110 may include the second indication in the DCI scheduling Msg3 retransmission based at least in part on the first indication received in the Msg3 PUSCH communication. As described above in connection with FIG. 5, the second indication may be an indication of whether the UE 120 is to perform BWP switching to a target uplink BWP or perform RF re-tuning, for at least one other subsequent communication during the RACH procedure. The DCI scheduling Msg3 retransmission may be DCI format 0_0. In some aspects, the second indication may be included in at least one of an NDI field or a HARQ process ID field of the DCI scheduling Msg3 retransmission.

In some aspects, the second indication, included in the DCI scheduling Msg3 retransmission, may be a one bit indication of whether to perform BWP switching (e.g., to a target uplink BWP configured in the system information) or perform RF re-tuning (e.g., to not perform BWP switching). In some aspects, the second indication, included in the DCI scheduling Msg3 retransmission, may indicate a location of the target uplink BWP within the initial uplink BWP. For example, the second indication may indicate (e.g., a via multi-bit indication) a selection of a target uplink BWP from multiple target uplink BWP candidates or a selection not to perform BWP switching (e.g., perform RF re-tuning).

As further shown in FIG. 6, and by reference number 625, the base station 110 may transmit, to the UE 120 a Msg4 communication (e.g., a contention resolution message). The Msg4 communication may include a Msg4 PDCCH communication including Msg4 DCI (e.g., DCI masked by TC-RNTI) that schedules a Msg4 PDSCH communication. The UE 120 may monitor a search space to decode the Msg4 PDCCH with the Msg4 DCI masked by TC-RNTI, and based at least in part on successfully decoding the Msg4 PDCCH, the UE 120 may decode the Msg4 PDSCH. In some aspects, the base station 110 may include the second indication in the Msg4 DCI based at least in part on the first indication received in the Msg3 PUSCH communication. As described above in connection with FIG. 5, the second indication may be an indication of whether the UE 120 is to perform BWP switching to a target uplink BWP or perform RF re-tuning, for at least one other subsequent communication during the RACH procedure. The Msg4 DCI may be DCI format 1_0. In some aspects, the second indication may be included in a DAI field of the Msg4 DCI In some aspects, the second indication, included in the Msg4 DCI, may be a one bit indication of whether to perform BWP switching (e.g., to a target uplink BWP configured in the system information) or perform RF re-tuning (e.g., not perform BWP switching). In some aspects, the second indication, included in the Msg4 DCI, may indicate a location of the target uplink BWP within the initial uplink BWP. For example, the second indication may indicate (e.g., a via multi-bit indication) a selection of a target uplink BWP from multiple target uplink BWP candidates or a selection not to perform BWP switching (e.g., perform RF re-tuning).

As further shown in FIG. 6, and by reference number 630, the UE 120 may transmit, to the base station 110, a HARQ ACK for Msg4 using BWP switching or RF re-tuning based at least in part on the second indication. In some aspects, based at least in part on the second indication including an indication to perform BWP switching, the UE 120 may switch from the initial uplink BWP to the target uplink BWP and transmit a PUCCH communication including the HARQ ACK for Msg4 in the target BWP. In some aspects, the target uplink BWP may be located within the initial uplink BWP, at an edge of the initial uplink BWP. In some aspects, the target uplink BWP may be located within the initial uplink BWP and centered at the same center frequency as the CORESET #0. In some aspects, the UE 120 may transmit the PUCCH communication including the HARQ ACK for Msg4 using frequency hopping with carrier frequencies within the target uplink BWP.

In some aspects, based at least in part on the second indication including an indication to perform RF re-tuning (e.g., an indication not to perform BWP switching), the UE 120 may transmit the PUCCH communication including the HARQ ACK for Msg4 using RF re-tuning within the initial uplink BWP. In this case, the UE 120 may transmit the PUCCH communication including the HARQ ACK with frequency hopping within the initial uplink BWP in at least a first transmission and a second transmission on different carrier frequencies. In some aspects, the UE 120 may puncture one or more symbols from at least one of the first transmission or the second transmission based at least in part on a symbol puncture pattern, resulting in an RF re-tuning gap between the first transmission and the second transmission. During the RF re-tuning gap between the first transmission and the second transmission, the UE may perform RF re-tuning from a first frequency band that includes the carrier frequency for the first transmission to a second frequency band that includes the carrier frequency for the second transmission.

As indicated above, FIG. 6 is provided as an example. Other examples may differ from what is described with respect to FIG. 6.

Figure 7:
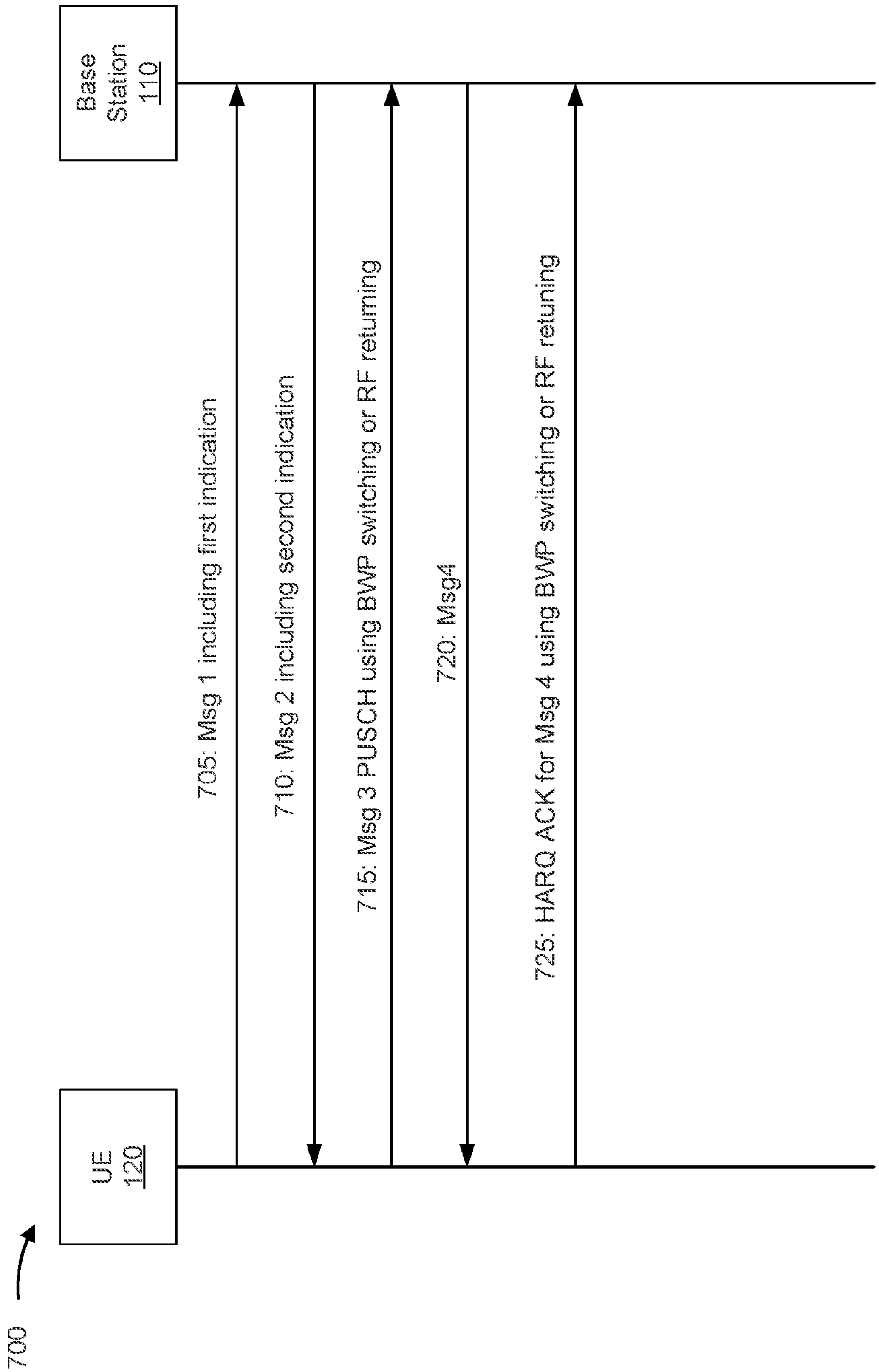

FIG. 7 is a diagram illustrating an example 700 associated with narrowband uplink communications in a RACH procedure for RedCap UEs, in accordance with the present disclosure. As shown in FIG. 7, example 700 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink. In some aspects, the UE 120 may be a Redcap UE.

As shown in FIG. 7, and by reference number 705, the UE 120 may transmit, to the base station 110, a Msgl communication that includes the first indication. The UE 120 may transmit the Msg 1 communication to initiate a four-step RACH procedure. For example, the Msgl communication may include a random access request in which the UE 120 transmits a PRACH preamble to the base station 110. In some aspects, the Msgl communication may include the first indication. As described above, the first indication may be an indication that the UE 120 is a RedCap UE type. In some aspects, the first indication may be a one bit indication of whether the UE 120 is a RedCap UE type or a non-RedCap UE type. In some aspects, the first indication may indicate a type of RedCap UE for the UE 120, from multiple RedCap UE types. In some aspects, the UE 120 may transmit the first indication during the Msg1 transmission, in addition to the PRACH preamble, via a separate transmission in the initial uplink BWP, via a separate PRACH resource, or via PRACH preamble partitioning.

As further shown in FIG. 7, and by reference number 710, the base station 110 may transmit, to the UE 120, a Msg2 communication that includes the second indication. The base station 110 may transmit, to the UE 120, a Msg2 PDCCH communication including Msg2 DCI (e.g., DCI masked by RA-RNTI) that schedules a Msg2 PDSCH communication. The base station 110 may transmit the RAR to the UE 120 in the scheduled Msg2 PDSCH communication. The RAR may indicate a resource allocation for a Msg3 PUSCH communication. As described above, the second indication may be an indication of whether the UE 120 is to perform BWP switching to a target uplink BWP or perform RF re-tuning, for at least one other subsequent communication during the RACH procedure.

In some aspects, the base station 110 may include the second indication in the Msg2 DCI (e.g., the DCI scheduling the Msg 2 PDSCH communication including the RAR) based at least in part on the first indication received in the Msgl communication. The Msg2 DCI may be DCI format 1_0. In some aspects, the second indication may be included in a DAI field of the Msg2 DCI.

In some aspects, the base station 110 may include the second indication in the Msg2 PDSCH communication (e.g., in the RAR transmitted in the Msg2 PDSCH communication) based at least in part on the first indication received in the Msgl communication. For example, the second indication may be included in a CSI request field of the RAR transmitted in the Msg2 PDSCH communication.

In some aspects, the second indication, included in the Msg 2 DCI or the Msg2 RAR, may be a one bit indication of whether to perform BWP switching (e.g., to a target uplink BWP configured in the system information) or perform RF re-tuning (e.g., not perform BWP switching). In some aspects, the second indication, included in the Msg 2 DCI or the Msg2 RAR, may indicate a location of the target uplink BWP within the initial uplink BWP. For example, the second indication may indicate (e.g., a via multi-bit indication) a selection of a target uplink BWP from multiple target uplink BWP candidates or a selection not to perform BWP switching (e.g., perform RF re-tuning).

As further shown in FIG. 7, and by reference number 715, the UE 120 may transmit, to the base station 110, a Msg3 PUSCH communication using BWP switching or RF re-tuning based at least in part on the second indication. In some aspects, based at least in part on the second indication including an indication to perform BWP switching, the UE 120 may switch from the initial uplink BWP to the target uplink BWP and transmit the Msg3 PUSCH communication in the target BWP. In some aspects, the target uplink BWP may be located within the initial uplink BWP, at an edge of the initial uplink BWP. In some aspects, the target uplink BWP may be located within the initial uplink BWP and centered at the same center frequency as the CORESET #0. In some aspects, the UE 120 may transmit the Msg3 PUSCH communication using frequency hopping with carrier frequencies within the target uplink BWP. For example, the base station 110 may allocate resources to the UE 120 Msg3 PUSCH communication using multiple transmissions on multiple frequencies within the target uplink BWP.

In some aspects, based at least in part on the second indication including an indication to perform RF re-tuning (e.g., an indication not to perform BWP switching), and a determination that frequency hopping has been indicated (e.g., in the RAR) for the Msg3 PUSCH communication, the UE 120 may transmit the Msg3 PUSCH communication using RF re-tuning within the initial uplink BWP. For example, the UE 120 may transmit the PUCCH communication including the HARQ ACK with frequency hopping within the initial uplink BWP in at least a first transmission and a second transmission on different carrier frequencies. In this case, the carrier frequencies allocated for the first transmission and the second transmission may be separated by a bandwidth that is greater than a bandwidth supported by the UE 120. In some aspects, the UE 120 may puncture one or more symbols from at least one of the first transmission or the second transmission based at least in part on a symbol puncture pattern, resulting in an RF re-tuning gap between the first transmission and the second transmission. During the RF re-tuning gap between the first transmission and the second transmission, the UE may perform RF re-tuning from a first frequency band that includes the carrier frequency for the first transmission to a second frequency band that includes the carrier frequency for the second transmission.

As further shown in FIG. 7, and by reference number 720, the base station 110 may transmit, to the UE 120, a Msg4 communication. The Msg4 communication may include a Msg4 PDCCH communication including Msg4 DCI (e.g., DCI masked by TC-RNTI) that schedules a Msg4 PDSCH communication. The UE 120 may monitor a search space to decode the Msg4 PDCCH with the Msg4 DCI masked by TC-RNTI, and based at least in part on successfully decoding the Msg4 PSCCH, the UE 120 may decode the Msg4 PDSCH.

As further shown in FIG. 7, and by reference number 725, the UE 120 may transmit, to the base station 110, a HARQ ACK for Msg4 using BWP switching or RF re-tuning based at least in part on the second indication. In some aspects, based at least in part on the second indication including an indication to perform BWP switching, the UE 120 may switch from the initial uplink BWP to the target uplink BWP and transmit a PUCCH communication including the HARQ ACK for Msg4 in the target BWP. In some aspects, the target uplink BWP may be located within the initial uplink BWP, at an edge of the initial uplink BWP. In some aspects, the target uplink BWP may be located within the initial uplink BWP and centered at the same center frequency as the CORESET #0. In some aspects, the UE 120 may transmit the PUCCH communication including the HARQ ACK for Msg4 using frequency hopping with carrier frequencies within the target uplink BWP.

In some aspects, based at least in part on the second indication including an indication to perform RF re-tuning (e.g., an indication not to perform BWP switching), the UE 120 may transmit the PUCCH communication including the HARQ ACK for Msg4 using RF re-tuning within the initial uplink BWP. In this case, the UE 120 may transmit the PUCCH communication including the HARQ ACK with frequency hopping within the initial uplink BWP in at least a first transmission and a second transmission on different carrier frequencies. In some aspects, the UE 120 may puncture one or more symbols from at least one of the first transmission or the second transmission based at least in part on a symbol puncture pattern, resulting in an RF re-tuning gap between the first transmission and the second transmission. During the RF re-tuning gap between the first transmission and the second transmission, the UE may perform RF re-tuning from a first frequency band that includes the carrier frequency for the first transmission to a second frequency band that includes the carrier frequency for the second transmission.

As indicated above, FIG. 7 is provided as an example. Other examples may differ from what is described with respect to FIG. 7.

Figure 8:
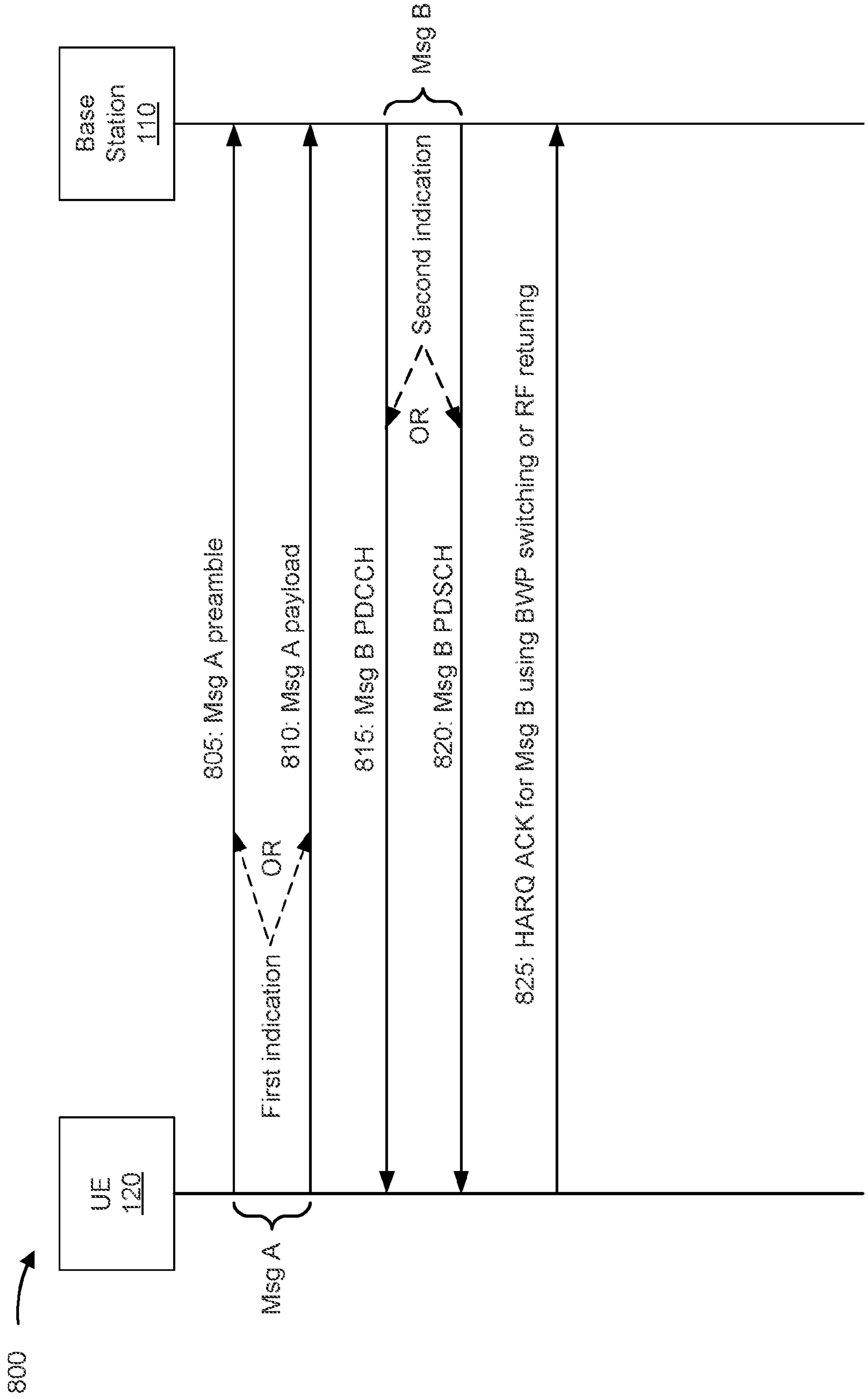

FIG. 8 is a diagram illustrating an example 800 associated with narrowband uplink communications in a RACH procedure for RedCap UEs, in accordance with the present disclosure. As shown in FIG. 8, example 800 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink. In some aspects, the UE 120 may be a Redcap UE.

As shown in FIG. 8, and by reference number 805, the UE 120 may transmit, to the base station 110, a MsgA preamble communication. The UE 120 may transmit the MsgA preamble communication to initiate a two-step RACH procedure. For example, the UE 120 may transmit a PRACH preamble to the base station 110. In some aspects, the MsgA preamble communication may include the first indication. As described above, the first indication may be an indication that the UE 120 is a RedCap UE type. In some aspects, the first indication may be a one bit indication of whether the UE 120 is a RedCap UE type or a non-RedCap UE type. In some aspects, the first indication may indicate a type of RedCap UE for the UE 120, from multiple RedCap UE types. In some aspects, the UE 120 may transmit the first indication during the MsgA preamble transmission, in addition to the PRACH preamble, via a separate transmission in the initial uplink BWP, via a separate PRACH resource, or via PRACH preamble partitioning.

As further shown in FIG. 8, and by reference number 810, the UE 120 may transmit, to the base station 110, a MsgA payload (e.g., MsgA PUSCH communication). In some aspects, the MsgA PUSCH communication may include the first indication. As described above, the first indication may be an indication that the UE 120 is a RedCap UE type. In some aspects, the first indication may be a one bit indication of whether the UE 120 is a RedCap UE type or a non-RedCap UE type. In some aspects, the first indication may indicate a type of RedCap UE for the UE 120, from multiple RedCap UE types. In some aspects, the indication may be included in one or more bit fields of the MsgA PUSCH communication.

In some aspects, the UE 120 may perform RF re-tuning between transmitting the MsgA preamble and transmitting the MsgA PUSCH communication. For example, a frequency band for the UE 120 to transmit the MsgA preamble may be centered on a different frequency than a frequency band for the UE 120 to transmit the MsgB preamble. Based at least in part on the capability of the UE 120 and the SCS in the initial uplink BWP, a length of a gap between the MsgA preamble transmission and the MsgA PUSCH communication (e.g., 2 symbols for 15 kHz SCS or 30 kHz SCS, and 4 symbols for 60 kHz SCS or 120 kHZ SCS) may not be long enough for the UE 120 to perform RF re-tuning.

In some aspects, a first gap size and a second gap size may be configured for an SCS. The first configured gap size may be associated with non-RedCap UEs and the second configured gap size may be associated with RedCap UEs. Based at least in part on a determination that the frequency band for the UE 120 to transmit the MsgA preamble is centered on a different frequency than the frequency band for the UE 120 to transmit the MsgA PUSCH communication, the UE 120 (e.g., a RedCap UE) may select the second configured gap size for the gap between the MsgA preamble transmission and the MsgA PUSCH communication. In this case, the second configured gap size may be larger than the first configured gap size, and the UE 120 may perform RF re-tuning during the gap between the MsgA preamble transmission and the MsgA PUSCH communication.

In some aspects, based at least in part on a determination that the frequency band for the UE 120 to transmit the MsgA preamble is centered on a different frequency than the frequency band for the UE 120 to transmit the MsgA PUSCH communication, the UE 120 may determine whether the gap between the MsgA preamble transmission and the MsgA PUSCH communication does not satisfy a threshold for RF re-tuning for the UE 120. Based at least in part on a determination that the gap between the MsgA preamble transmission and the MsgA PUSCH communication does not satisfy the threshold, the UE 120 may puncture one or more non-DMRS starting symbols of the MsgA PUSCH communication. This may increase a size of the gap between the MsgA preamble transmission and the MsgA PUSCH communication, resulting in an RF re-tuning gap that satisfies the threshold. The UE 120 may perform RF re-tuning in the RF re-tuning gap between the MsgA preamble transmission and the MsgA PUSCH communication.

As further shown in FIG. 8, and by reference number 815, the base station 110 may transmit, to the UE 120, a MsgB PDCCH communication. The MsgB PDCCH communication may include MsgB DCI (e.g., DCI masked by MsgB-RNTI) that schedules a MsgB PDSCH communication. In some aspects, the base station 110 may include the second indication in the MsgB DCI based at least in part on the first indication received in the MsgA preamble and/or MsgA payload. As described above in connection with FIG. 5, the second indication may be an indication of whether the UE 120 is to perform BWP switching to a target uplink BWP or perform RF re-tuning, for at least one other subsequent communication during the RACH procedure. The MsgB DCI may be DCI format 1_0. In some aspects, the second indication may be included in a DAI field of the MsgB DCI.

In some aspects, the second indication, included in the MsgB DCI, may be a one bit indication of whether to perform BWP switching (e.g., to a target uplink BWP configured in the system information) or perform RF re-tuning (e.g., not perform BWP switching). In some aspects, the second indication, included in the MsgB DCI, may indicate a location of the target uplink BWP within the initial uplink BWP. For example, the second indication may indicate (e.g., a via multi-bit indication) a selection of a target uplink BWP from multiple target uplink BWP candidates or a selection not to perform BWP switching (e.g., perform RF re-tuning).

As further shown in FIG. 8, and by reference number 820, the base station 110 may transmit, to the UE 120, the MsgB PDSCH communication scheduled by the MsgB DCI in the MsgB PDCCH communication. In some aspects, the base station 110 may include the second indication in the MsgB PDSCH communication. For example, the base station 110 may include the second indication in an RAR transmitted in the MsgB PDSCH communication. As described above in connection with FIG. 5, the second indication may be an indication of whether the UE 120 is to perform BWP switching to a target uplink BWP or perform RF re-tuning, for at least one other subsequent communication during the RACH procedure.

In some aspects, the second indication, included in the MsgB PDSCH communication, may be a one bit indication of whether to perform BWP switching (e.g., to a target uplink BWP configured in the system information) or perform RF re-tuning (e.g., not perform BWP switching). In some aspects, the second indication, included in the MsgB PDSCH communication, may indicate a location of the target uplink BWP within the initial uplink BWP. For example, the second indication may indicate (e.g., via a multi-bit indication) a selection of a target uplink BWP from multiple target uplink BWP candidates or a selection not to perform BWP switching (e.g., perform RF re-tuning).

As further shown in FIG. 8, and by reference number 825, the UE 120 may transmit, to the base station 110, a HARQ ACK for MsgB (e.g., a HARQ ACK for the MsgB PDSCH communication) using BWP switching or RF re-tuning based at least in part on the second indication. In some aspects, based at least in part on the second indication including an indication to perform BWP switching, the UE 120 may switch from the initial uplink BWP to the target uplink BWP and transmit a PUCCH communication including the HARQ ACK for MsgB in the target BWP. In some aspects, the target uplink BWP may be located within the initial uplink BWP, at an edge of the initial uplink BWP. In some aspects, the target uplink BWP may be located within the initial uplink BWP and centered at the same center frequency as the CORESET #0. In some aspects, the UE 120 may transmit the PUCCH communication including the HARQ ACK for MsgB using frequency hopping with carrier frequencies within the target uplink BWP.

In some aspects, based at least in part on the second indication including an indication to perform RF re-tuning (e.g., an indication not to perform BWP switching), the UE 120 may transmit the PUCCH communication including the HARQ ACK for MsgB using RF re-tuning within the initial uplink BWP. In this case, the UE 120 may transmit the PUCCH communication including the HARQ ACK with frequency hopping within the initial uplink BWP in at least a first transmission and a second transmission on different carrier frequencies. In some aspects, the UE 120 may puncture one or more symbols from at least one of the first transmission or the second transmission based at least in part on a symbol puncture pattern, resulting in an RF re-tuning gap between the first transmission and the second transmission. During the RF re-tuning gap between the first transmission and the second transmission, the UE may perform RF re-tuning from a first frequency band that includes the carrier frequency for the first transmission to a second frequency band that includes the carrier frequency for the second transmission.

As indicated above, FIG. 8 is provided as an example. Other examples may differ from what is described with respect to FIG. 8.

Figure 9:
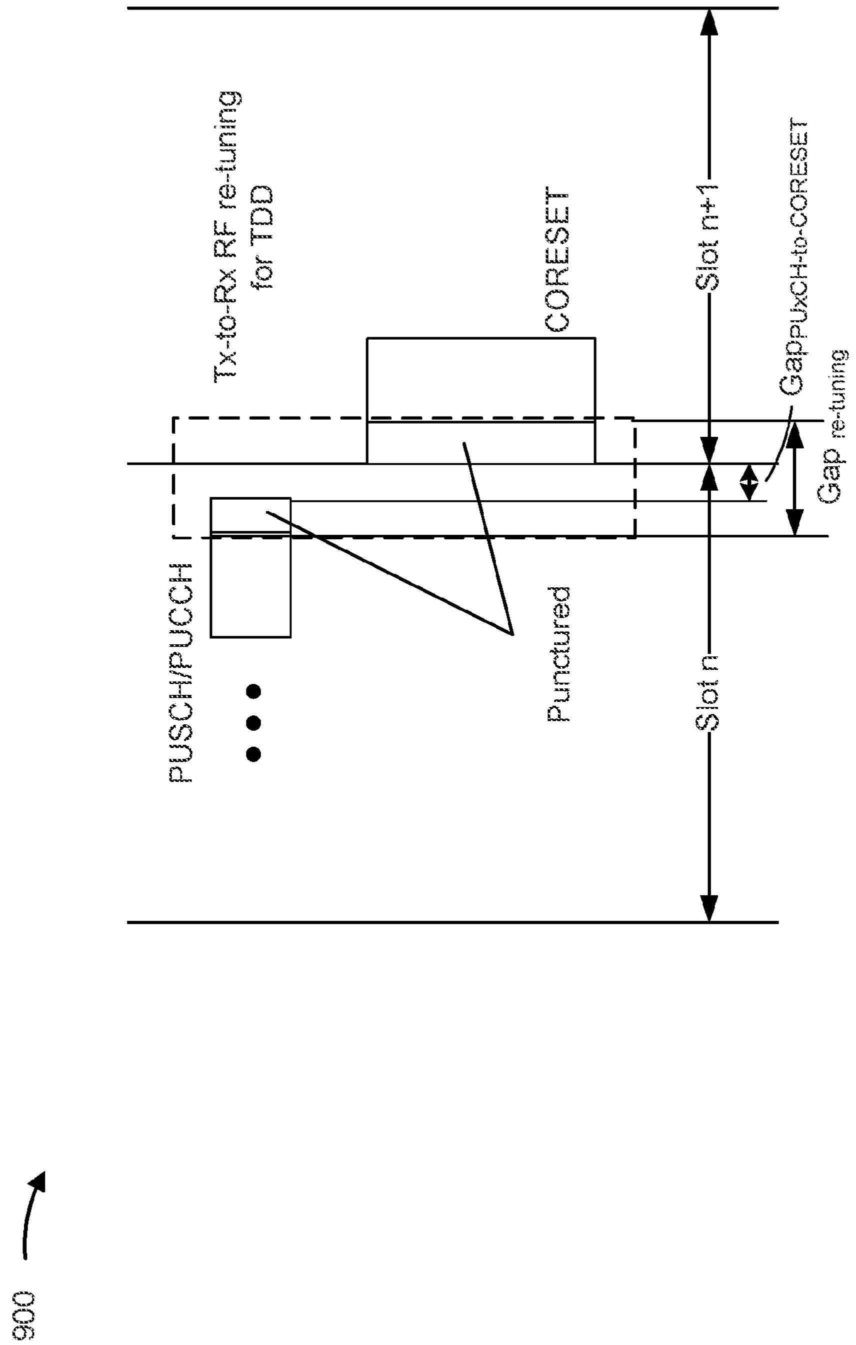

FIG. 9 is a diagram illustrating an example 900 associated with narrowband uplink communications in a RACH procedure for RedCap UEs, in accordance with the present disclosure. As shown in FIG. 9, example 900 illustrates transmission-to-reception (Tx-to-Rx) re-tuning for TDD performed by a RedCap UE (e.g., UE 120) between an uplink communication (e.g., PUSCH or PUCCH communication) and a downlink monitoring occasion during a RACH procedure.

In some aspects, for a RedCap UE with a narrow bandwidth capability in a TDD system, a frequency band associated with an uplink transmission (e.g., PUSCH or PUCCH communication) during a RACH procedure may be centered on a different frequency than a CORESET (e.g., CORESET #0) for downlink monitoring and reception in a subsequent monitoring occasion. For example, based at least in part on RF re-tuning within the initial uplink BWP or BWP switching to a target uplink BWP not centered on the same frequency as CORESET #0, a UE may transmit an uplink transmission during a RACH procedure (e.g., a Msg3 PUSCH communication, a PUCCH communication including a HARQ ACK for Msg4, or a PUCCH communication including a HARQ ACK for MsgB) using a frequency band centered on a different frequency than the CORESET of a subsequent monitoring occasion in which a downlink communication may be received from a base station.

As shown in FIG. 9, in a case in which a frequency band used by the UE fora last transmission of a PUSCH or PUCCH communication (e.g., a last hop or a PUSCH communication without frequency hopping) during a RACH procedure is centered on a different frequency than the CORESET to be monitored in the subsequent monitoring occasion, the UE may determine whether a gap between the PUSCH/PUCCH communication and the CORESET ($Gap_{PUxCH\text{-}to\text{-}CORESET}$) satisfies a length threshold. For example, the length threshold may be a length associated with an RF re-tuning gap ($Gap_{re\text{-}timing}$) for the UE. In some aspects, the RF re-tuning gap length may be determined based at least in part on SCS. Based at least in part on a determination that the frequency band associated with the last transmission of a PUSCH/PUCCH communication is centered on a different frequency than the CORESET to be monitored in the subsequent monitoring occasion, and based at least in part on a determination that $Gap_{PUxCH\text{-}to\text{-}CORESET}$ does not satisfy the length threshold, the UE may puncture one or more symbols from at least one of the PUSCH/PUCCH communication or the CORESET. For example, the UE may puncture a total number of ($Gap_{re\text{-}timing}-Gap_{PUxCH\text{-}to\text{-}CORESET}$) symbols in order to increase the gap between the PUSCH/PUCCH communication and the CORESET to the RF re-tuning gap ($Gap_{re\text{-}timing}$) that satisfies the length threshold.

In some aspects, the UE may puncture the one or more symbols from an end of the PUSCH/PUCCH communication and/or a beginning of the CORESET based at least in part on a symbol puncture pattern and/or a set of puncture rules configured for the UE. In some aspects, the UE may always puncture the one or more symbols from the CORESET. In this case, the UE may monitor the un-punctured symbols of the CORESET, or the UE may directly discard the monitoring occasion.

In some aspects, in a case in which the PUSCH/PUCCH communication is a PUSCH communication, the UE may prioritize puncturing data symbols from the PUSCH communication over puncturing data symbols of the CORESET. In this case, the UE may not puncture DMRS symbols from the PUSCH communication. For example, for each of n symbols to be punctured, the UE may select a symbol at the end of the PUSCH communication unless the symbol is a DMRS symbol, in which case the UE may select a symbol at the beginning of the CORESET.

In some aspects, in a case in which the PUSCH/PUCCH communication is a PUCCH communication, the UE may prioritize puncturing symbols from the PUCCH communication or from the CORESET communication based at least in part on a format type of the PUCCH communication. For example, the PUCCH communication including the HARQ ACK for Msg4 may have a long PUCCH format 1 or a short PUCCH format 0. In some aspects, in a case in which the format type of the PUCCH communication is PUCCH format 1, the UE may prioritize puncturing data symbols of the PUCCH (other than DMRS data symbols) over puncturing data symbols of the CORESET. For example, for each of n symbols to be punctured, the UE may select a symbol at the end of the PUCCH communication unless the symbol is a DMRS symbol, in which case the UE may select a symbol at the beginning of the CORESET. In some aspects, in a case in which the format type of the PUCCH communication is PUCCH format 0, the UE may not puncture the PUCCH, and may puncture the one or more symbols only from the CORESET.

As shown in FIG. 9, puncturing the one or more symbols from the PUSCH/PUCCH communication and/or the CORESET may result in an RF re-tuning gap ($Gap_{re\text{-}timing}$) between the PUSCH/communication and the CORESET. The UE may perform RF re-tuning, during the RF re-tuning gap ($Gap_{re\text{-}timing}$), from the frequency band associated with the last transmission of the PUSCH/PUCCH communication to a frequency band centered on the center frequency of the CORESET for the subsequent monitoring occasion.

As indicated above, FIG. 9 is provided as an example. Other examples may differ from what is described with respect to FIG. 9.

Figure 10:
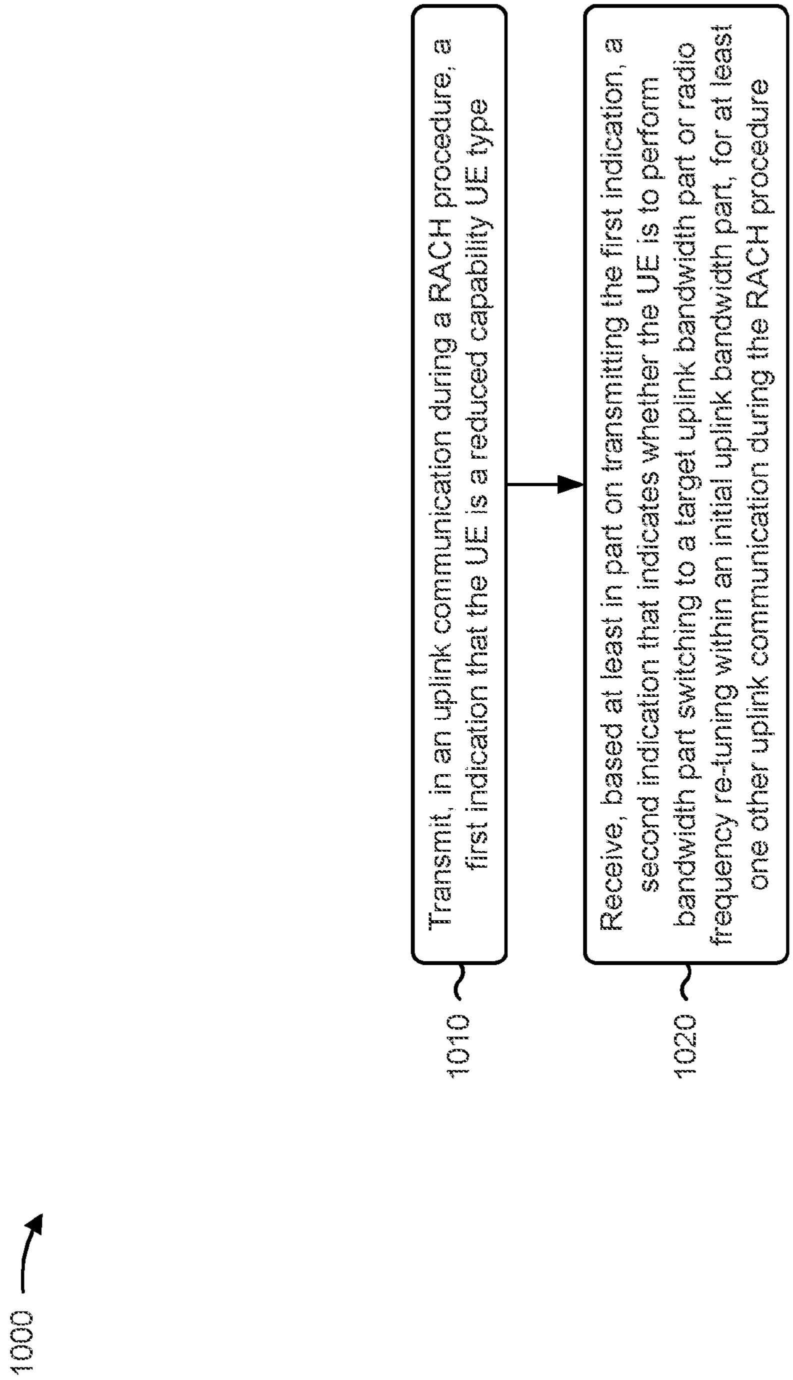
FIGS. 10-11 are diagrams illustrating example processes associated with narrowband uplink communications in a RACH procedure for RedCap UEs, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with narrowband uplink communications in a RACH procedure for RedCap UEs.

As shown in FIG. 10, in some aspects, process 1000 may include transmitting, to a base station in an uplink communication during a RACH procedure, a first indication that the UE is a reduced capability UE type (block 1010). For example, the UE (e.g., using transmission component 1204, depicted in FIG. 12) may transmit, to a base station in an uplink communication during a RACH procedure, a first indication that the UE is a reduced capability UE type, as described above.

As further shown in FIG. 10, in some aspects, process 1000 may include receiving, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure (block 1020). For example, the UE (e.g., using reception component 1202, depicted in FIG. 12) may receive, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure, as described above.

Process 1000 may include additional aspects, such as any single aspect or any combination of aspects described below and/or in connection with one or more other processes described elsewhere herein.

In a first aspect, the second indication indicates that the UE is to perform bandwidth part switching to the target uplink bandwidth part, the target uplink bandwidth part has a narrower bandwidth than the initial uplink bandwidth part, and process 1000 includes switching from the initial uplink bandwidth part to the target uplink bandwidth part based at least in part on receiving the second indication and transmitting the at least one other uplink communication during the RACH procedure in the target uplink bandwidth part.

In a second aspect, alone or in combination with the first aspect, the target uplink bandwidth part is within the initial uplink bandwidth part.

In a third aspect, alone or in combination with one or more of the first and second aspects, the target uplink bandwidth part is located at an edge of the initial uplink bandwidth part.

In a fourth aspect, alone or in combination with one or more of the first through third aspects, the target uplink bandwidth part is centered at a center frequency of a control resource set used for downlink communications during the RACH procedure.

In a fifth aspect, alone or in combination with one or more of the first through fourth aspects, the target uplink bandwidth part has a same subcarrier spacing as the initial uplink bandwidth part.

In a sixth aspect, alone or in combination with one or more of the first through fifth aspects, process 1000 includes receiving, prior to transmitting the first indication, a system information block including a configuration of the initial uplink bandwidth part and a configuration of the target uplink bandwidth part.

In a seventh aspect, alone or in combination with one or more of the first through sixth aspects, the system information block includes an indication of a number of physical resource blocks in the target uplink bandwidth part.

In an eighth aspect, alone or in combination with one or more of the first through seventh aspects, the second indication further indicates a location of the target uplink bandwidth part within the initial uplink bandwidth part.

In a ninth aspect, alone or in combination with one or more of the first through eighth aspects, transmitting the at least one other uplink communication during the RACH procedure in the target uplink bandwidth part includes transmitting the at least one other uplink communication during the RACH procedure with frequency hopping on frequencies within the target uplink bandwidth part.

In a tenth aspect, alone or in combination with one or more of the first through ninth aspects, the second indication indicates that the UE is to perform radio frequency re-tuning within an initial uplink bandwidth part, and process 1000 includes transmitting the at least one other uplink communication during the RACH procedure with frequency hopping, including at least a first transmission on a first frequency and a second transmission on a second frequency, puncturing one or more symbols from at least one of the first transmission or the second transmission, resulting in a radio frequency re-tuning gap between the first transmission and the second transmission, and performing radio frequency re-tuning during the radio frequency re-tuning gap between the first transmission and the second transmission.

In an eleventh aspect, alone or in combination with one or more of the first through tenth aspects, the uplink communication in which the first indication is transmitted is a Msg1 communication and the at least one other uplink communication includes at least one of a Msg3 physical uplink shared channel communication or a physical uplink control channel communication that includes hybrid automatic repeat request acknowledgement for a Msg4 communication.

In a twelfth aspect, alone or in combination with one or more of the first through eleventh aspects, the uplink communication in which the first indication is transmitted is a Msg3 physical uplink shared channel communication and the at least one other uplink communication is a physical uplink control channel communication that includes a hybrid automatic repeat request acknowledgement for a Msg4 communication.

In a thirteenth aspect, alone or in combination with one or more of the first through twelfth aspects, the second indication is included in downlink control information associated with scheduling a Msg4 physical downlink shared channel communication or downlink control information associated with scheduling retransmission of a Msg3 physical uplink shared channel communication.

In a fourteenth aspect, alone or in combination with one or more of the first through thirteenth aspects, the uplink communication in which the first indication is transmitted is a Msg1 communication, and the second indication is included in a Msg 2 random access response or downlink control information associated with scheduling the Msg2 random access response.

In a fifteenth aspect, alone or in combination with one or more of the first through fourteenth aspects, the uplink communication in which the first indication is transmitted is at least one of a MsgA preamble transmission or a MsgA physical uplink shared channel communication, and the second indication is included in DCI associated with scheduling a MsgB physical downlink shared channel communication.

In a sixteenth aspect, alone or in combination with one or more of the first through fifteenth aspects, the at least one other uplink communication during the RACH procedure includes a PUSCH or PUCCH communication, and process 1000 includes, based at least in part on a determination that a frequency band associated with transmitting the PUSCH or PUCCH communication is centered on a different frequency than a CORESET to be monitored in a monitoring occasion subsequent to the PUSCH or PUCCH communication, and based at least in part on a determination that a gap between the PUSCH or PUCCH communication and the CORESET does not satisfy a threshold puncturing one or more symbols from at least one of the PUSCH or PUCCH communication or the CORESET, resulting in a radio frequency re-tuning gap between the PUSCH or PUCCH communication and the CORESET that satisfies the threshold, and performing radio frequency re-tuning during the radio frequency re-tuning gap between the PUSCH or PUCCH communication and the CORESET.

In a seventeenth aspect, alone or in combination with one or more of the first through sixteenth aspects, puncturing the one or more symbols from at least one of the PUSCH or PUCCH communication or the CORESET includes puncturing the one or more symbols from the CORESET.

In an eighteenth aspect, alone or in combination with one or more of the first through seventeenth aspects, the PUSCH or PUCCH communication is a PUSCH communication, and puncturing the one or more symbols from at least one of the PUSCH or PUCCH communication or the CORESET prioritizes puncturing data symbols of the PUSCH communication, without puncturing demodulation reference symbols of the PUSCH communication.

In a nineteenth aspect, alone or in combination with one or more of the first through eighteenth aspects, the PUSCH or PUCCH communication is a PUCCH communication, and puncturing the one or more symbols from at least one of the PUSCH or PUCCH communication or the CORESET prioritizes puncturing data symbols of the PUCCH communication, without puncturing demodulation reference symbols of the PUCCH communication, or prioritizes puncturing symbols from the CORESET based at least in part on a format type of the PUCCH communication.

In a twentieth aspect, alone or in combination with one or more of the first through nineteenth aspects, puncturing the one or more data symbols from at least one of the PUSCH or PUCCH communication includes puncturing the one or more symbols from the CORESET without puncturing symbols from the PUCCH communication based at least in part on a determination that the format type of the PUCCH communication is PUCCH format 0.

In a twenty-first aspect, alone or in combination with one or more of the first through twentieth aspects, the uplink communication in which the first indication is transmitted is at least one of a MsgA preamble transmission or a MsgA PUSCH communication, and process 1000 includes selecting, from a first configured gap size associated with non-reduced capacity UEs and a second configured gap size for reduced capacity UEs, the second configured gap size for a gap between the MsgA preamble transmission and the MsgA PUSCH communication based at least in part on a determination that a frequency band for the UE to transmit the MsgA preamble is centered on a different frequency than a frequency band for the UE to transmit the MsgA PUSCH communication, and the second configured gap size is larger than the first configured gap size, and performing radio frequency re-tuning in the gap between the MsgA preamble transmission and the MsgA PUSCH communication.

In a twenty-second aspect, alone or in combination with one or more of the first through twenty-first aspects, the uplink communication in which the first indication is transmitted is at least one of a MsgA preamble transmission or a MsgA PUSCH communication, and process 1000 includes puncturing, based at least in part on a determination that a gap between the MsgA preamble transmission and the MsgA PUSCH communication does not satisfy a threshold, one or more starting symbols, other than demodulation reference signals, of the MsgA PUSCH communication, resulting in a radio frequency re-tuning gap between the MsgA preamble transmission and the MsgA PUSCH communication that satisfies the threshold, and performing radio frequency re-tuning in the radio frequency re-tuning gap between the MsgA preamble transmission and the MsgA PUSCH communication.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
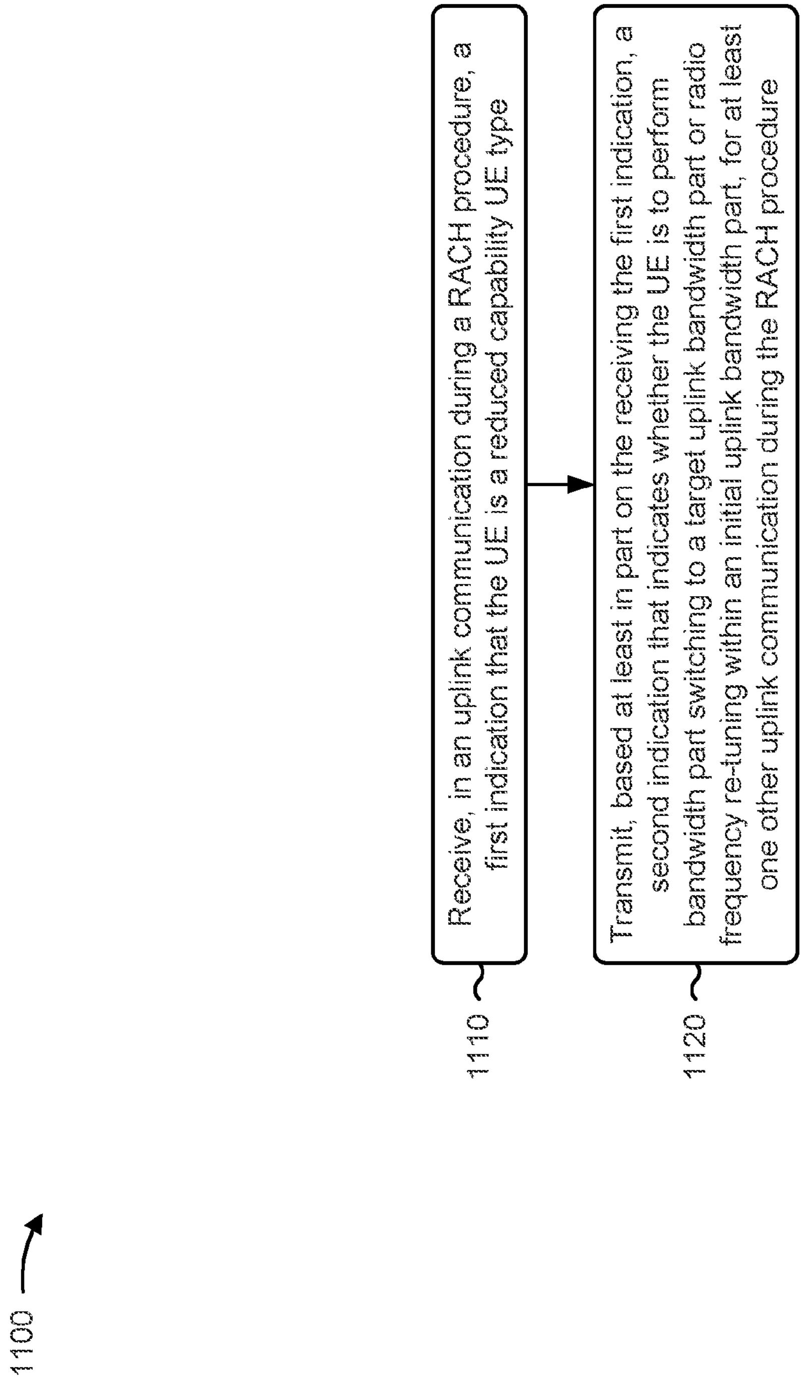

FIG. 11 is a diagram illustrating an example process 1100 performed, for example, by a base station, in accordance with the present disclosure. Example process 1100 is an example where the base station (e.g., base station 110) performs operations associated with narrowband uplink communications in a RACH procedure for RedCap UEs.

As shown in FIG. 11, in some aspects, process 1100 may include receiving, from a UE in an uplink communication during a RACH procedure, a first indication that the UE is a reduced capability UE type (block 1110). For example, the base station (e.g., using reception component 1302, depicted in FIG. 13) may receive, from a UE in an uplink communication during a RACH procedure, a first indication that the UE is a reduced capability UE type, as described above.

As further shown in FIG. 11, in some aspects, process 1100 may include transmitting, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure (block 1120). For example, the base station (e.g., using transmission component 1304, depicted in FIG. 13) may transmit, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure, as described above.

Process 1100 may include additional aspects, such as any single aspect or any combination of aspects described below and/or in connection with one or more other processes described elsewhere herein.

In a first aspect, the second indication indicates that the UE is to perform bandwidth part switching to the target uplink bandwidth part, the target uplink bandwidth part has a narrower bandwidth than the initial uplink bandwidth part, and process 1100 includes receiving, from the UE, the at least one other uplink communication during the RACH procedure in the target uplink bandwidth part.

In a second aspect, alone or in combination with the first aspect, the target uplink bandwidth part is within the initial uplink bandwidth part.

In a third aspect, alone or in combination with one or more of the first and second aspects, the target uplink bandwidth part is located at an edge of the initial uplink bandwidth part.

In a fourth aspect, alone or in combination with one or more of the first through third aspects, the target uplink bandwidth part is centered at a center frequency of a control resource set used for downlink communications during the RACH procedure.

In a fifth aspect, alone or in combination with one or more of the first through fourth aspects, the target uplink bandwidth part has a same subcarrier spacing as the initial uplink bandwidth part.

In a sixth aspect, alone or in combination with one or more of the first through fifth aspects, process 1100 includes transmitting a system information block including a configuration of the initial uplink bandwidth part and a configuration of the target uplink bandwidth part.

In a seventh aspect, alone or in combination with one or more of the first through sixth aspects, the system information block includes an indication of a number of physical resource blocks in the target uplink bandwidth part.

In an eighth aspect, alone or in combination with one or more of the first through seventh aspects, the second indication further indicates a location of the target uplink bandwidth part within the initial uplink bandwidth part.

In a ninth aspect, alone or in combination with one or more of the first through eighth aspects, receiving the at least one other uplink communication during the RACH procedure in the target uplink bandwidth part includes receiving the at least one other uplink communication during the RACH procedure with frequency hopping on frequencies within the target uplink bandwidth part.

In a tenth aspect, alone or in combination with one or more of the first through ninth aspects, the second indication indicates that the UE is to perform radio frequency re-tuning within an initial uplink bandwidth part, and process 1100 includes receiving, from the UE, the at least one other uplink communication during the RACH procedure with frequency hopping, including at least a first transmission on a first frequency and a second transmission on a second frequency, and one or more symbols are punctured from at least one of the first transmission or the second transmission, resulting in a radio frequency re-tuning gap for the UE between the first transmission and the second transmission.

In an eleventh aspect, alone or in combination with one or more of the first through tenth aspects, the uplink communication in which the first indication is received is a Msg1 communication and the at least one other uplink communication includes at least one of a Msg3 physical uplink shared channel communication or a physical uplink control channel communication that includes hybrid automatic repeat request acknowledgement for a Msg4 communication.

In a twelfth aspect, alone or in combination with one or more of the first through eleventh aspects, the uplink communication in which the first indication is received is a Msg3 physical uplink shared channel communication and the at least one other uplink communication is a physical uplink control channel communication that includes a hybrid automatic repeat request acknowledgement for a Msg4 communication.

In a thirteenth aspect, alone or in combination with one or more of the first through twelfth aspects, the second indication is included in downlink control information associated with scheduling a Msg4 physical downlink shared channel communication or downlink control information associated with scheduling retransmission of a Msg3 physical uplink shared channel communication.

In a fourteenth aspect, alone or in combination with one or more of the first through thirteenth aspects, the uplink communication in which the first indication is received is a Msg1 communication, and the second indication is included in a Msg 2 random access response or downlink control information associated with scheduling the Msg2 random access response.

In a fifteenth aspect, alone or in combination with one or more of the first through fourteenth aspects, the uplink communication in which the first indication is received is at least one of a MsgA preamble transmission or a MsgA physical uplink shared channel communication, and the second indication is included in DCI associated with scheduling a MsgB physical downlink shared channel communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
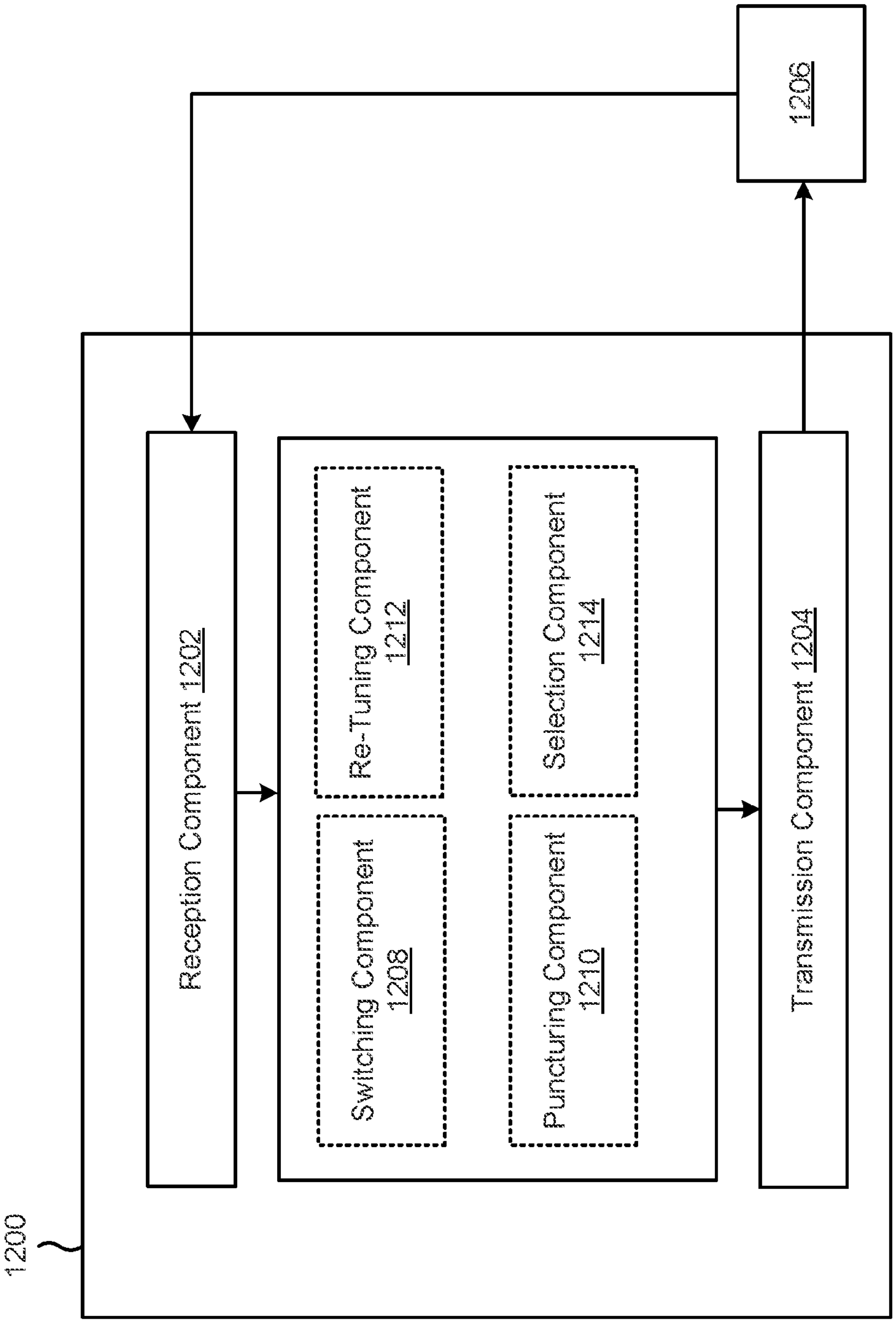
FIGS. 12-13 are block diagrams of example apparatuses for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a switching component 1208, a puncturing component 1210, a re-tuning component 1212, or a selection component 1214, among other examples.

In some aspects, the apparatus 1200 may be configured to perform one or more operations described herein in connection with FIGS. 5-9. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The transmission component 1204 may transmit, to a base station in an uplink communication during a RACH procedure, a first indication that the UE is a reduced capability UE type. The reception component 1202 may receive, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure.

The switching component 1208 may switch from the initial uplink bandwidth part to the target uplink bandwidth part based at least in part on receiving the second indication, wherein the target uplink bandwidth part has a narrower bandwidth than the initial uplink bandwidth part. The transmission component 1204 may transmit the at least one other uplink communication during the RACH procedure in the target uplink bandwidth part.

The reception component 1202 may receive, prior to transmitting the first indication, a system information block including a configuration of the initial uplink bandwidth part and a configuration of the target uplink bandwidth part.

The transmission component 1204 may transmit the at least one other uplink communication during the RACH procedure with frequency hopping on frequencies within the target uplink bandwidth part.

The transmission component 1204 may transmit the at least one other uplink communication during the RACH procedure with frequency hopping, including at least a first transmission on a first frequency and a second transmission on a second frequency. The puncturing component 1210 may puncture one or more symbols from at least one of the first transmission or the second transmission, resulting in a radio frequency re-tuning gap between the first transmission and the second transmission. The re-tuning component 1212 may perform radio frequency re-tuning during the radio frequency re-tuning gap between the first transmission and the second transmission.

The puncturing component 1210 may puncture one or more symbols from at least one of the PUSCH or PUCCH communication or the CORESET, resulting in a radio frequency re-tuning gap between the PUSCH or PUCCH communication and the CORESET that satisfies the threshold. The re-tuning component 1212 may perform radio frequency re-tuning during the radio frequency re-tuning gap between the PUSCH or PUCCH communication and the CORESET.

The puncturing component 1210 may puncture the one or more symbols from the CORESET.

The puncturing component 1210 may puncture the one or more symbols from the CORESET without puncturing symbols from the PUCCH communication based at least in part on a determination that the format type of the PUCCH communication is PUCCH format 0.

The selection component 1214 may select, from a first configured gap size associated with non-RedCap UEs and a second configured gap size for RedCap UEs, the second configured gap size for a gap between the MsgA preamble transmission and the MsgA PUSCH communication based at least in part on a determination that a frequency band for the UE to transmit the MsgA preamble is centered on a different frequency than a frequency band for the UE to transmit the MsgA PUSCH communication. The second configured gap size may be larger than the first configured gap size. The re-tuning component 1212 may perform radio frequency re-tuning in the gap between the MsgA preamble transmission and the MsgA PUSCH communication.

The puncturing component 1210 may puncture, based at least in part on a determination that a gap between the MsgA preamble transmission and the MsgA PUSCH communication does not satisfy a threshold, one or more starting symbols, other than demodulation reference signals, of the MsgA PUSCH communication, resulting in a radio frequency re-tuning gap between the MsgA preamble transmission and the MsgA PUSCH communication that satisfies the threshold. The re-tuning component 1212 may perform radio frequency re-tuning in the radio frequency re-tuning gap between the MsgA preamble transmission and the MsgA PUSCH communication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
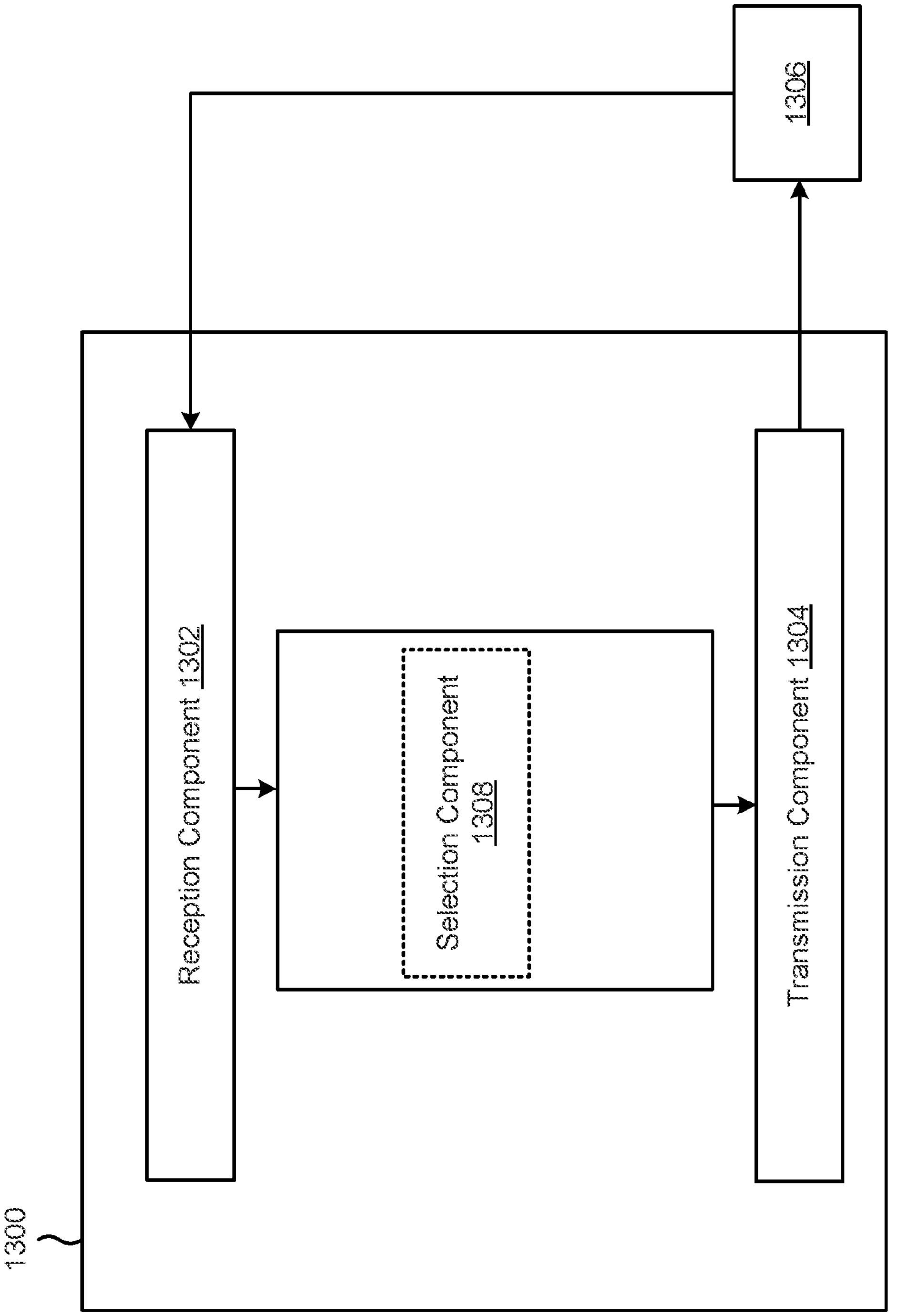

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a selection component 1308, among other examples.

In some aspects, the apparatus 1300 may be configured to perform one or more operations described herein in connection with FIGS. 5-9. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The reception component 1302 may receive, from a UE in an uplink communication during a RACH procedure, a first indication that the UE is a reduced capability UE type. The transmission component 1304 may transmit, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure. The selection component 1308 may select the second indication.

The reception component 1302 may receive, from the UE, the at least one other uplink communication during the RACH procedure in the target uplink bandwidth part, wherein the target uplink bandwidth part has a narrower bandwidth than the initial uplink bandwidth part.

The transmission component 1304 may transmit a system information block including a configuration of the initial uplink bandwidth part and a configuration of the target uplink bandwidth part.

The reception component 1302 may receive the at least one other uplink communication during the RACH procedure with frequency hopping on frequencies within the target uplink bandwidth part.

The reception component 1302 may receive, from the UE, the at least one other uplink communication during the RACH procedure with frequency hopping, including at least a first transmission on a first frequency and a second transmission on a second frequency, wherein one or more symbols are punctured from at least one of the first transmission or the second transmission, resulting in a radio frequency re-tuning gap for the UE between the first transmission and the second transmission.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: transmitting, to a base station in an uplink communication during a random access channel (RACH) procedure, a first indication that the UE is a reduced capability UE type; and receiving, from the base station and based at least in part on transmitting the first indication, a second indication that indicates whether the UE is to perform bandwidth part switching to a target uplink bandwidth part or radio frequency re-tuning within an initial uplink bandwidth part, for at least one other uplink communication during the RACH procedure.

Aspect 2: The method of Aspect 1, wherein the second indication indicates that the UE is to perform bandwidth part switching to the target uplink bandwidth part, and further comprising: switching from the initial uplink bandwidth part to the target uplink bandwidth part based at least in part on receiving the second indication, wherein the target uplink bandwidth part has a narrower bandwidth than the initial uplink bandwidth part; and transmitting the at least one other uplink communication during the RACH procedure in the target uplink bandwidth part.

Aspect 3: The method of Aspect 2, wherein the target uplink bandwidth part is within the initial uplink bandwidth part.

Aspect 4: The method of Aspect 3, wherein the target uplink bandwidth part is located at an edge of the initial uplink bandwidth part.

Aspect 5: The method of Aspect 3, wherein the target uplink bandwidth part is centered at a center frequency of a control resource set used for downlink communications during the RACH procedure.

Aspect 6: The method of any of Aspects 2-5, wherein the target uplink bandwidth part has a same subcarrier spacing as the initial uplink bandwidth part.

Aspect 7: The method of any of Aspects 2-6, further comprising: receiving, prior to transmitting the first indication, a system information block including a configuration of the initial uplink bandwidth part and a configuration of the target uplink bandwidth part.

Aspect 8: The method of Aspect 7, wherein the system information block includes an indication of a number of physical resource blocks in the target uplink bandwidth part.

Aspect 9: The method of any of Aspects 2-6, wherein the second indication further indicates a location of the target uplink bandwidth part within the initial uplink bandwidth part.

Aspect 10: The method of any of Aspects 2-9, wherein transmitting the at least one other uplink communication during the RACH procedure in the target uplink bandwidth part comprises: transmitting the at least one other uplink communication during the RACH procedure with frequency hopping on frequencies within the target uplink bandwidth part.

Aspect 11: The method of Aspect 1, wherein the second indication indicates that the UE is to perform radio frequency re-tuning within an initial uplink bandwidth part, and further comprising: transmitting the at least one other uplink communication during the RACH procedure with frequency hopping, including at least a first transmission on a first frequency and a second transmission on a second frequency; puncturing one or more symbols from at least one of the first transmission or the second transmission, resulting in a radio frequency re-tuning gap between the first transmission and the second transmission; and performing radio frequency re-tuning during the radio frequency re-tuning gap between the first transmission and the second transmission.

Aspect 12: The method of any of Aspects 1-11, wherein the uplink communication in which the first indication is transmitted is a Msg1 communication and the at least one other uplink communication includes at least one of a Msg3 physical uplink shared channel communication or a physical uplink control channel communication that includes hybrid automatic repeat request acknowledgement for a Msg4 communication.

Aspect 13: The method of any of Aspects 1-11, wherein the uplink communication in which the first indication is transmitted is a Msg3 physical uplink shared channel communication and the at least one other uplink communication is a physical uplink control channel communication that includes a hybrid automatic repeat request acknowledgement for a Msg4 communication.

Aspect 14: The method of any of Aspects 1-13, wherein the second indication is included in downlink control information associated with scheduling a Msg4 physical downlink shared channel communication or downlink control information associated with scheduling retransmission of a Msg3 physical uplink shared channel communication.

Aspect 15: The method of any of Aspects 1-12, wherein the uplink communication in which the first indication is transmitted is a Msg1 communication, and the second indication is included in a Msg 2 random access response or downlink control information associated with scheduling the Msg2 random access response.

Aspect 16: The method of any of Aspects 1-11, wherein the uplink communication in which the first indication is transmitted is at least one of a MsgA preamble transmission or a MsgA physical uplink shared channel communication, and the second indication is included in DCI associated with scheduling a MsgB physical downlink shared channel communication.

Aspect 17: The method of any of Aspects 1-16, wherein the at least one other uplink communication during the RACH procedure includes a physical uplink shared channel (PUSCH) or physical uplink control channel (PUCCH) communication, and wherein the method further comprises, based at least in part on a determination that a frequency band associated with transmitting the PUSCH or PUCCH communication is centered on a different frequency than a control resource set (CORESET) to be monitored in a monitoring occasion subsequent to the PUSCH or PUCCH communication, and based at least in part on a determination that a gap between the PUSCH or PUCCH communication and the CORESET does not satisfy a threshold; puncturing one or more symbols from at least one of the PUSCH or PUCCH communication or the CORESET, resulting in a radio frequency re-tuning gap between the PUSCH or PUCCH communication and the CORESET that satisfies the threshold; and performing radio frequency re-tuning during the radio frequency re-tuning gap between the PUSCH or PUCCH communication and the CORESET.

Aspect 18: The method of Aspect 17, wherein puncturing the one or more symbols from at least one of the PUSCH or PUCCH communication or the CORESET comprises: puncturing the one or more symbols from the CORESET.

Aspect 19: The method of Aspect 17, wherein the PUSCH or PUCCH communication is a PUSCH communication, and puncturing the one or more symbols from at least one of the PUSCH or PUCCH communication or the CORESET prioritizes puncturing data symbols of the PUSCH communication, without puncturing demodulation reference symbols of the PUSCH communication.

Aspect 20: The method of Aspect 17, wherein the PUSCH or PUCCH communication is a PUCCH communication, and puncturing the one or more symbols from at least one of the PUSCH or PUCCH communication or the CORESET prioritizes puncturing data symbols of the PUCCH communication, without puncturing demodulation reference symbols of the PUCCH communication, or prioritizes puncturing symbols from the CORESET based at least in part on a format type of the PUCCH communication.

Aspect 21: The method of Aspect 20, wherein puncturing the one or more data symbols from at least one of the PUSCH or PUCCH communication comprises: puncturing the one or more symbols from the CORESET without puncturing symbols from the PUCCH communication based at least in part on a determination that the format type of the PUCCH communication is PUCCH format 0.

Aspect 22: The method of any of Aspects 1-11 and/or 16-21, wherein the uplink communication in which the first indication is transmitted is at least one of a MsgA preamble transmission or a MsgA physical uplink shared channel (PUSCH) communication, and further comprising: selecting, from a first configured gap size associated with non-reduced capacity UEs and a second configured gap size for reduced capacity UEs, the second configured gap size for a gap between the MsgA preamble transmission and the MsgA PUSCH communication based at least in part on a determination that a frequency band for the UE to transmit the MsgA preamble is centered on a different frequency than a frequency band for the UE to transmit the MsgA PUSCH communication, wherein the second configured gap size is larger than the first configured gap size, and performing radio frequency re-tuning in the gap between the MsgA preamble transmission and the MsgA PUSCH communication.

Aspect 23: The method of any of Aspects 1-11 and/or 16-21, wherein the uplink communication in which the first indication is transmitted is at least one of a MsgA preamble transmission or a MsgA physical uplink shared channel (PUSCH) communication, and further comprising: puncturing, based at least in part on a determination that a gap between the MsgA preamble transmission and the MsgA PUSCH communication does not satisfy a threshold, one or more starting symbols, other than demodulation reference signals, of the MsgA PUSCH communication, resulting in a radio frequency re-tuning gap between the MsgA preamble transmission and the MsgA PUSCH communication that satisfies the threshold; and performing radio frequency re-tuning in the radio frequency re-tuning gap between the MsgA preamble transmission and the MsgA PUSCH communication.

Aspect 24: A method of wireless communication performed by a base station, comprising: receiving, from a user equipment (UE) in an uplink communication during a random access channel (RACH) procedure, a first indication that the UE is a reduced capability UE type; and transmitting, to the UE and based at least in part on the receiving the first indication, a second indication that indicates whether the UE is to perform bandwidth part switching to a target uplink bandwidth part or radio frequency re-tuning within an initial uplink bandwidth part, for at least one other uplink communication during the RACH procedure.

Aspect 25: The method of Aspect 24, wherein the second indication indicates that the UE is to perform bandwidth part switching to the target uplink bandwidth part, and further comprising: receiving, from the UE, the at least one other uplink communication during the RACH procedure in the target uplink bandwidth part, wherein the target uplink bandwidth part has a narrower bandwidth than the initial uplink bandwidth part.

Aspect 26: The method of Aspect 25, wherein the target uplink bandwidth part is within the initial uplink bandwidth part.

Aspect 27: The method of Aspect 26, wherein the target uplink bandwidth part is located at an edge of the initial uplink bandwidth part.

Aspect 28: The method of Aspect 26, wherein the target uplink bandwidth part is centered at a center frequency of a control resource set used for downlink communications during the RACH procedure.

Aspect 29: The method of any of Aspects 25-28, wherein the target uplink bandwidth part has a same subcarrier spacing as the initial uplink bandwidth part.

Aspect 30: The method of any of Aspects 25-29, further comprising: transmitting a system information block including a configuration of the initial uplink bandwidth part and a configuration of the target uplink bandwidth part.

Aspect 31: The method of Aspect 30, wherein the system information block includes an indication of a number of physical resource blocks in the target uplink bandwidth part.

Aspect 32: The method of any of Aspects 25-29, wherein the second indication further indicates a location of the target uplink bandwidth part within the initial uplink bandwidth part.

Aspect 33: The method of any of Aspects 25-32, wherein receiving the at least one other uplink communication during the RACH procedure in the target uplink bandwidth part comprises: receiving the at least one other uplink communication during the RACH procedure with frequency hopping on frequencies within the target uplink bandwidth part.

Aspect 34: The method of Aspect 24, wherein the second indication indicates that the UE is to perform radio frequency re-tuning within an initial uplink bandwidth part, and further comprising: receiving, from the UE, the at least one other uplink communication during the RACH procedure with frequency hopping, including at least a first transmission on a first frequency and a second transmission on a second frequency, wherein one or more symbols are punctured from at least one of the first transmission or the second transmission, resulting in a radio frequency re-tuning gap for the UE between the first transmission and the second transmission.

Aspect 35: The method of any of Aspects 24-34, wherein the uplink communication in which the first indication is received is a Msg1 communication and the at least one other uplink communication includes at least one of a Msg3 physical uplink shared channel communication or a physical uplink control channel communication that includes hybrid automatic repeat request acknowledgement for a Msg4 communication.

Aspect 36: The method of any of Aspects 24-34, wherein the uplink communication in which the first indication is received is a Msg3 physical uplink shared channel communication and the at least one other uplink communication is a physical uplink control channel communication that includes a hybrid automatic repeat request acknowledgement for a Msg4 communication.

Aspect 37: The method of any of Aspects 24-36, wherein the second indication is included in downlink control information associated with scheduling a Msg4 physical downlink shared channel communication or downlink control information associated with scheduling retransmission of a Msg3 physical uplink shared channel communication.

Aspect 38: The method of any of Aspects 24-35, wherein the uplink communication in which the first indication is received is a Msg1 communication, and the second indication is included in a Msg 2 random access response or downlink control information associated with scheduling the Msg2 random access response.

Aspect 39: The method of any of Aspects 24-34, wherein the uplink communication in which the first indication is received is at least one of a MsgA preamble transmission or a MsgA physical uplink shared channel communication, and the second indication is included in DCI associated with scheduling a MsgB physical downlink shared channel communication.

Aspect 40: An apparatus for wireless communication at a device, comprising a processor; memory coupled with the processor; and instructions stored in the memory and executable by the processor to cause the apparatus to perform the method of one or more Aspects of Aspects 1-23.

Aspect 41: An apparatus for wireless communication at a device, comprising a processor; memory coupled with the processor, and instructions stored in the memory and executable by the processor to cause the apparatus to perform the method of one or more Aspects of Aspects 24-39.

Aspect 42: A device for wireless communication, comprising a memory and one or more processors coupled to the memory, the memory and the one or more processors configured to perform the method of one or more Aspects of Aspects 1-23.

Aspect 43: A device for wireless communication, comprising a memory and one or more processors coupled to the memory, the memory and the one or more processors configured to perform the method of one or more Aspects of Aspects 24-39.

Aspect 44: An apparatus for wireless communication, comprising at least one means for performing the method of one or more Aspects of Aspects 1-23.

Aspect 45: An apparatus for wireless communication, comprising at least one means for performing the method of one or more Aspects of Aspects 24-39.

Aspect 46: A non-transitory computer-readable medium storing code for wireless communication, the code comprising instructions executable by a processor to perform the method of one or more Aspects of Aspects 1-23.

Aspect 47: A non-transitory computer-readable medium storing code for wireless communication, the code comprising instructions executable by a processor to perform the method of one or more Aspects of Aspects 24-39.

Aspect 48: A non-transitory computer-readable medium storing a set of instructions for wireless communication, the set of instructions comprising one or more instructions that, when executed by one or more processors of a device, cause the device to perform the method of one or more Aspects of Aspects 1-23.

Aspect 49: A non-transitory computer-readable medium storing a set of instructions for wireless communication, the set of instructions comprising one or more instructions that, when executed by one or more processors of a device, cause the device to perform the method of one or more Aspects of Aspects 24-39.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, individually or collectively configured to cause the UE to:

transmit, to a base station in an uplink communication during a random access channel (RACH) procedure, a first indication that the UE is a reduced capability UE type;

receive, from the base station and based at least in part on transmitting the first indication, a second indication that indicates that the UE is to perform bandwidth part switching from an initial uplink bandwidth part to a target uplink bandwidth part, for at least one other uplink communication during the RACH procedure, wherein the second indication indicates a location of the target uplink bandwidth part within the initial uplink bandwidth part; and transmit the at least one other uplink communication during the RACH procedure in the target uplink bandwidth part.

2. The UE of claim 1, wherein the target uplink bandwidth part has a narrower bandwidth than the initial uplink bandwidth part.

3. The UE of claim 1, wherein the target uplink bandwidth part is located at an edge of the initial uplink bandwidth part.

4. The UE of claim 1, wherein the target uplink bandwidth part is centered at a center frequency of a control resource set used for downlink communications during the RACH procedure.

5. The UE of claim 1, wherein the target uplink bandwidth part has a same subcarrier spacing as the initial uplink bandwidth part.

6. The UE of claim 1, wherein the one or more processors are further configured to cause the UE to:

receive, prior to transmitting the first indication, a system information block including a configuration of the initial uplink bandwidth part and a configuration of the target uplink bandwidth part.

7. The UE of claim 6, wherein the system information block includes an indication of a number of physical resource blocks in the target uplink bandwidth part.

8. The UE of claim 1, wherein the one or more processors are configured to cause the UE to:

transmit the at least one other uplink communication during the RACH procedure with frequency hopping on frequencies within the target uplink bandwidth part.

9. The UE of claim 1, wherein the uplink communication in which the first indication is transmitted is a Msg1 communication and the at least one other uplink communication includes at least one of a Msg3 physical uplink shared channel communication or a physical uplink control channel communication that includes hybrid automatic repeat request acknowledgement for a Msg4 communication.

10. The UE of claim 1, wherein the uplink communication in which the first indication is transmitted is a Msg3 physical uplink shared channel communication and the at least one other uplink communication is a physical uplink control channel communication that includes a hybrid automatic repeat request acknowledgement for a Msg4 communication.

11. The UE of claim 1, wherein the second indication is included in downlink control information associated with scheduling a Msg4 physical downlink shared channel communication or downlink control information associated with scheduling retransmission of a Msg3 physical uplink shared channel communication.

12. The UE of claim 1, wherein the uplink communication in which the first indication is transmitted is a Msg1 communication, and the second indication is included in a Msg 2 random access response or downlink control information associated with scheduling the Msg2 random access response.

13. The UE of claim 1, wherein the uplink communication in which the first indication is transmitted is at least one of a MsgA preamble transmission or a MsgA physical uplink shared channel communication, and the second indication is included in DCI associated with scheduling a MsgB physical downlink shared channel communication.

14. A user equipment (UE) for wireless communication, comprising:

a memory; and one or more processors, coupled to the memory, individually or collectively configured to cause the UE to:

transmit, to a base station in an uplink communication during a random access channel (RACH) procedure, a first indication that the UE is a reduced capability UE type;

receive, from the base station and based at least in part on transmitting the first indication, a second indication that indicates that the UE is to perform radio frequency re- tuning within an initial uplink bandwidth part, for at least one other uplink communication during the RACH procedure, transmit the at least one other uplink communication during the RACH procedure with frequency hopping, including at least a first transmission on a first frequency and a second transmission on a second frequency;

puncture one or more symbols from at least one of the first transmission or the second transmission, resulting in a radio frequency re-tuning gap between the first transmission and the second transmission; and perform radio frequency re-tuning during the radio frequency re-tuning gap between the first transmission and the second transmission.

15. The UE of claim 14, wherein the at least one other uplink communication during the RACH procedure includes a physical uplink shared channel (PUSCH) or physical uplink control channel (PUCCH) communication, and wherein the one or more processors are further configured to cause the UE to, based at least in part on a determination that a frequency band associated with transmitting the PUSCH or PUCCH communication is centered on a different frequency than a control resource set (CORESET) to be monitored in a monitoring occasion subsequent to the PUSCH or PUCCH communication, and based at least in part on a determination that a gap between the PUSCH or PUCCH communication and the CORESET does not satisfy a threshold:

puncture one or more symbols from at least one of the PUSCH or PUCCH communication or the CORESET, resulting in a radio frequency re-tuning gap between the PUSCH or PUCCH communication and the CORESET that satisfies the threshold; and perform radio frequency re-tuning during the radio frequency re-tuning gap between the PUSCH or PUCCH communication and the CORESET.

16. The UE of claim 15, wherein the one or more processors are configured to cause the UE to:

puncture the one or more symbols from the CORESET.

17. The UE of claim 15, wherein the PUSCH or PUCCH communication is a PUSCH communication, and puncturing the one or more symbols from at least one of the PUSCH or PUCCH communication or the CORESET prioritizes puncturing data symbols of the PUSCH communication, without puncturing demodulation reference symbols of the PUSCH communication.

18. The UE of claim 15, wherein the PUSCH or PUCCH communication is a PUCCH communication, and puncturing the one or more symbols from at least one of the PUSCH or PUCCH communication or the CORESET prioritizes puncturing data symbols of the PUCCH communication, without puncturing demodulation reference symbols of the PUCCH communication, or prioritizes puncturing symbols from the CORESET based at least in part on a format type of the PUCCH communication.

19. The UE of claim 18, wherein the one or more processors are configured to cause the UE to:

puncture the one or more symbols from the CORESET without puncturing symbols from the PUCCH communication based at least in part on a determination that the format type of the PUCCH communication is PUCCH format 0.

20. The UE of claim 14, wherein the uplink communication in which the first indication is transmitted is at least one of a MsgA preamble transmission or a MsgA physical uplink shared channel (PUSCH) communication, and the one or more processors are further configured to cause the UE to:

select, from a first configured gap size associated with non-reduced capacity UEs and a second configured gap size for reduced capacity UEs, the second configured gap size for a gap between the MsgA preamble transmission and the MsgA PUSCH communication based at least in part on a determination that a frequency band for the UE to transmit the MsgA preamble is centered on a different frequency than a frequency band for the UE to transmit the MsgA PUSCH communication, wherein the second configured gap size is larger than the first configured gap size; and perform radio frequency re-tuning in the gap between the MsgA preamble transmission and the MsgA PUSCH communication.

21. The UE of claim 14, wherein the uplink communication in which the first indication is transmitted is at least one of a MsgA preamble transmission or a MsgA physical uplink shared channel (PUSCH) communication, and the one or more processors are further configured to cause the UE to:

puncture, based at least in part on a determination that a gap between the MsgA preamble transmission and the MsgA PUSCH communication does not satisfy a threshold, one or more starting symbols, other than demodulation reference signals, of the MsgA PUSCH communication, resulting in a radio frequency re-tuning gap between the MsgA preamble transmission and the MsgA PUSCH communication that satisfies the threshold; and perform radio frequency re-tuning in the radio frequency re-tuning gap between the MsgA preamble transmission and the MsgA PUSCH communication.

22. A method of wireless communication performed by a user equipment (UE), comprising:

transmitting, to a base station in an uplink communication during a random access channel (RACH) procedure, a first indication that the UE is a reduced capability UE type;

receiving, from the base station and based at least in part on transmitting the first indication, a second indication that indicates that the UE is to perform bandwidth part switching from an initial uplink bandwidth part to a target uplink bandwidth part, for at least one other uplink communication during the RACH procedure, wherein the second indication indicates a location of the target uplink bandwidth part within the initial uplink bandwidth part; and transmitting the at least one other uplink communication during the RACH procedure in the target uplink bandwidth part.

23. The method of claim 22, wherein the target uplink bandwidth part has a narrower bandwidth than the initial uplink bandwidth part.

24. The method of claim 22, wherein the second indication is included in downlink control information associated with scheduling a Msg4 physical downlink shared channel communication or downlink control information associated with scheduling retransmission of a Msg3 physical uplink shared channel communication.

25. The method of claim 22, wherein the uplink communication in which the first indication is transmitted is a Msg1 communication, and the second indication is included in a Msg 2 random access response or downlink control information associated with scheduling the Msg2 random access response.

26. A method of wireless communication performed by a user equipment (UE), comprising:

transmitting, to a base station in an uplink communication during a random access channel (RACH) procedure, a first indication that the UE is a reduced capability UE type;

receiving, from the base station and based at least in part on transmitting the first indication, a second indication that indicates that the UE is to perform radio frequency re-tuning within an initial uplink bandwidth part, for at least one other uplink communication during the RACH procedure;

transmitting the at least one other uplink communication during the RACH procedure with frequency hopping, including at least a first transmission on a first frequency and a second transmission on a second frequency;

puncturing one or more symbols from at least one of the first transmission or the second transmission, resulting in a radio frequency re-tuning gap between the first transmission and the second transmission; and performing radio frequency re-tuning during the radio frequency re-tuning gap between the first transmission and the second transmission.

* * * * *